(12) United States Patent
Xie

(10) Patent No.: US 6,913,355 B2
(45) Date of Patent: *Jul. 5, 2005

(54) SPECTACLES SET WITH DETACHABLE MAGNETIC SHELTER FRAME

(76) Inventor: Yiling Xie, 1009 Arcadia Ave. Suite 3, Arcadia, CA (US) 91007

( * ) Notice: Subject to any disclaimer, the term of this patent is extended or adjusted under 35 U.S.C. 154(b) by 0 days.

This patent is subject to a terminal disclaimer.

(21) Appl. No.: 10/724,450

(22) Filed: Dec. 1, 2003

(65) Prior Publication Data

US 2004/0109130 A1 Jun. 10, 2004

Related U.S. Application Data

(63) Continuation-in-part of application No. 10/278,497, filed on Oct. 24, 2002, now Pat. No. 6,783,233, and a continuation-in-part of application No. 10/648,126, filed on Aug. 25, 2003.

(51) Int. Cl.[7] .............................................. G02C 9/00
(52) U.S. Cl. ........................................ 351/47; 351/57
(58) Field of Search ............................. 351/44, 41, 47, 351/48, 57, 158

(56) References Cited

U.S. PATENT DOCUMENTS

| 6,382,787 | B1 | * | 5/2002 | Xie | 351/47 |
| 6,540,348 | B1 | * | 4/2003 | Xie | 351/57 |
| 6,729,723 | B2 | * | 5/2004 | Xie | 351/57 |
| 6,761,449 | B1 | * | 7/2004 | Xie | 351/57 |
| 6,783,233 | B2 | * | 8/2004 | Xie | 351/47 |

* cited by examiner

*Primary Examiner*—Hung Xuan Dang
(74) *Attorney, Agent, or Firm*—Raymond Y. Chan; David and Raymond

(57) ABSTRACT

A spectacles set includes a primary spectacle frame which includes two nose supports thereof and a detachable shelter frame adapted for mounting in front of the primary spectacle frame. The detachable shelter frame includes a shelter frame for supporting two auxiliary lenses and a pair of magnetic attachment arrangements connected to the shelter frame. Each of the magnetic attachment arrangements includes a supporting arm extending rearwardly from the shelter bridge to securely mount the shelter frame in front of the primary spectacle frame and a magnetic seat which is connected to the supporting arm and extended to magnetically attach the nose supports of the primary spectacle frame so as to hold the shelter frame on the primary spectacle frame in position.

20 Claims, 35 Drawing Sheets

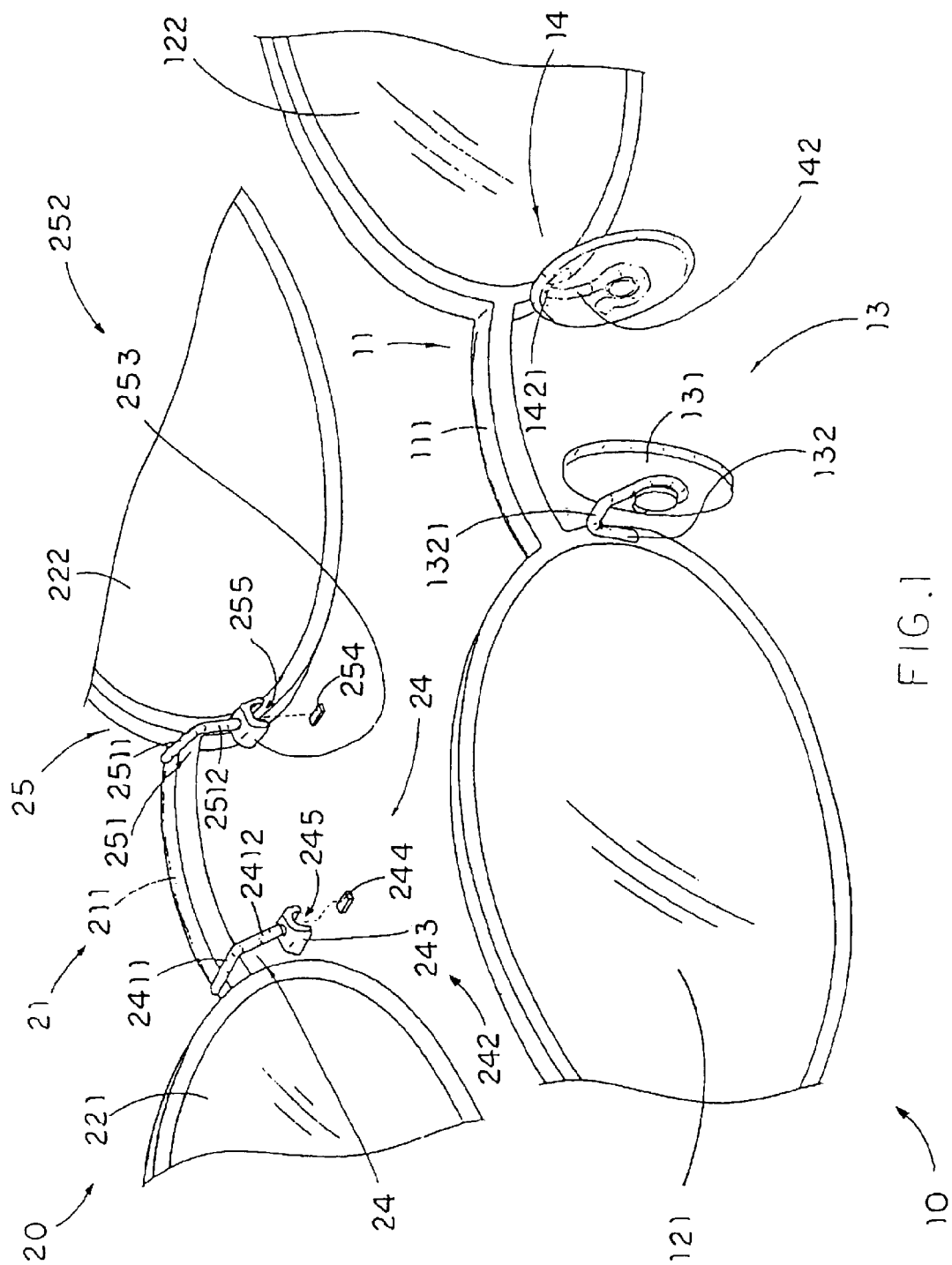

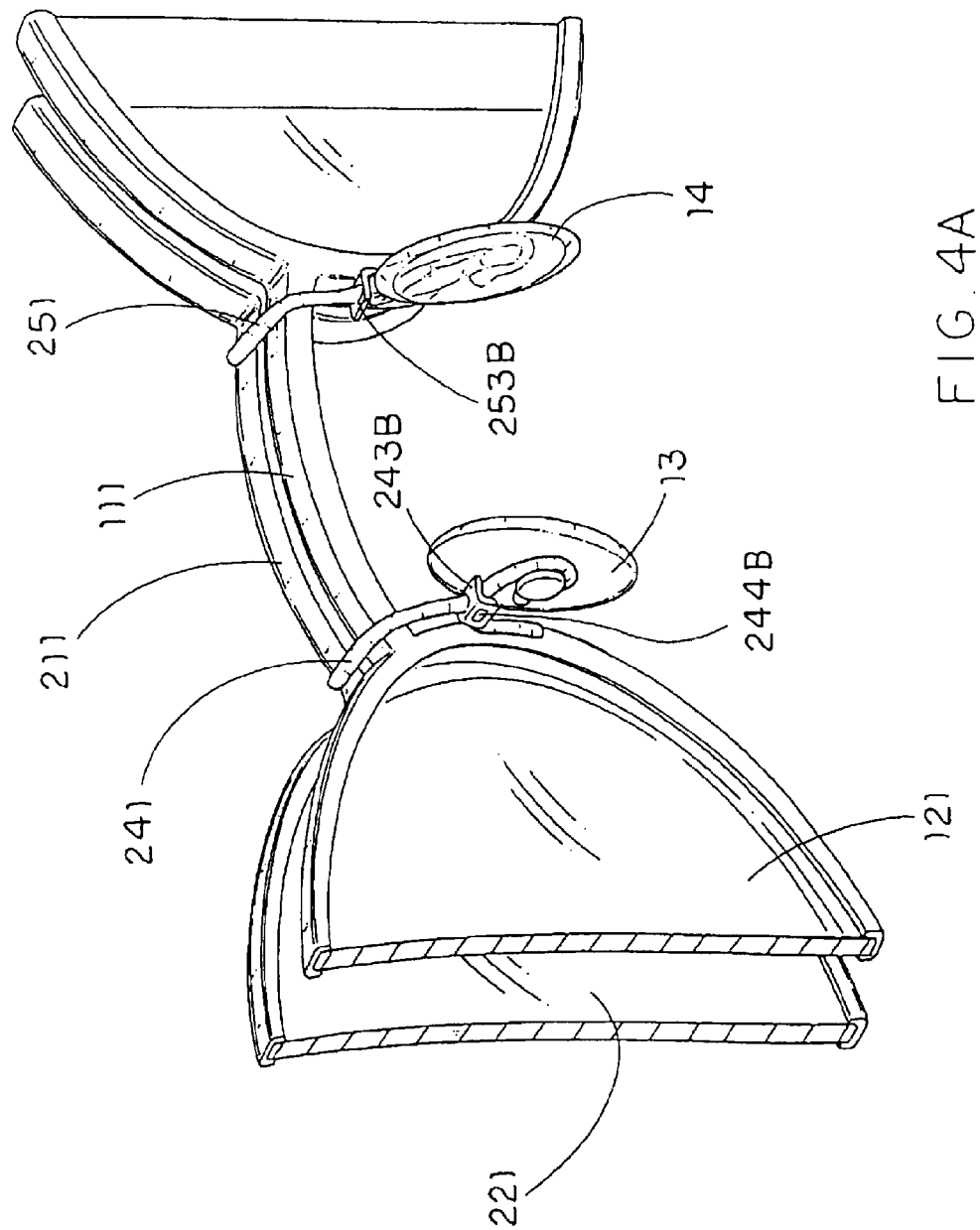

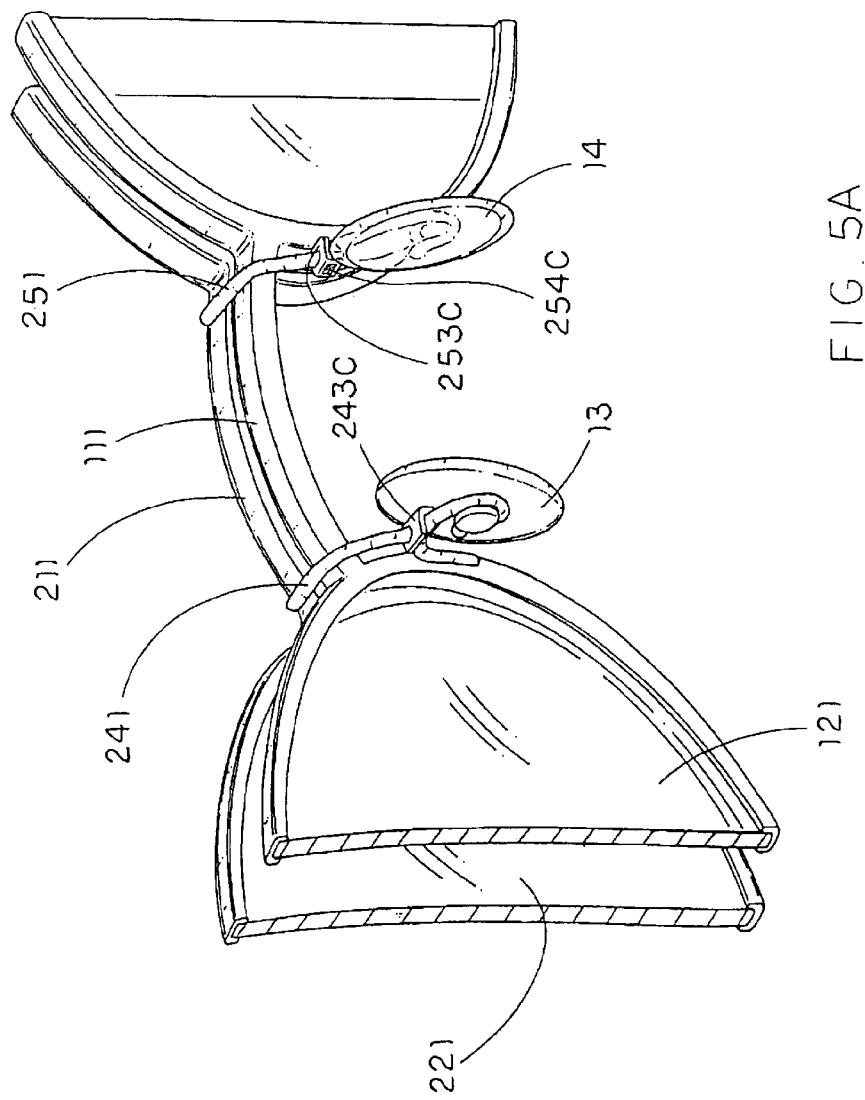

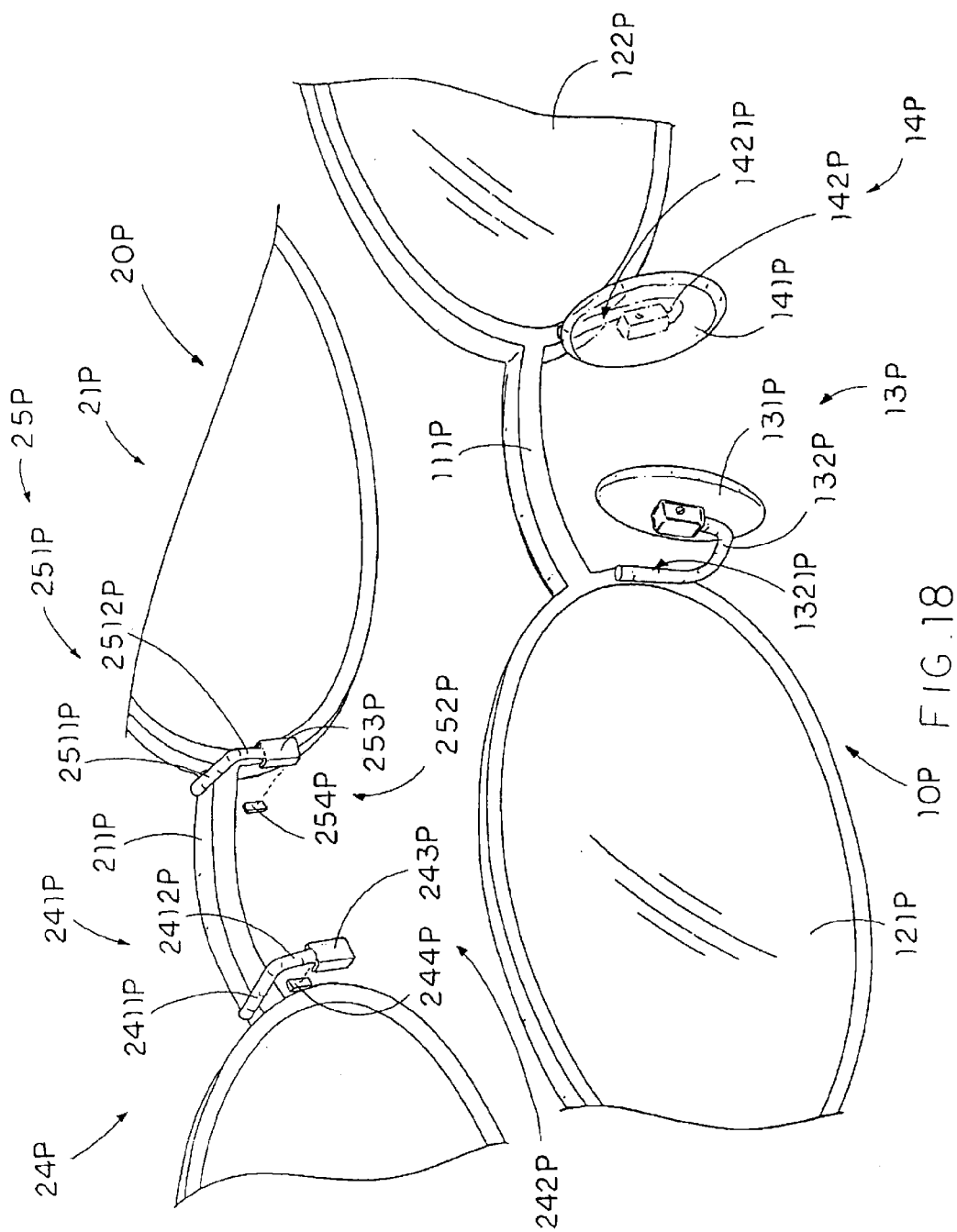

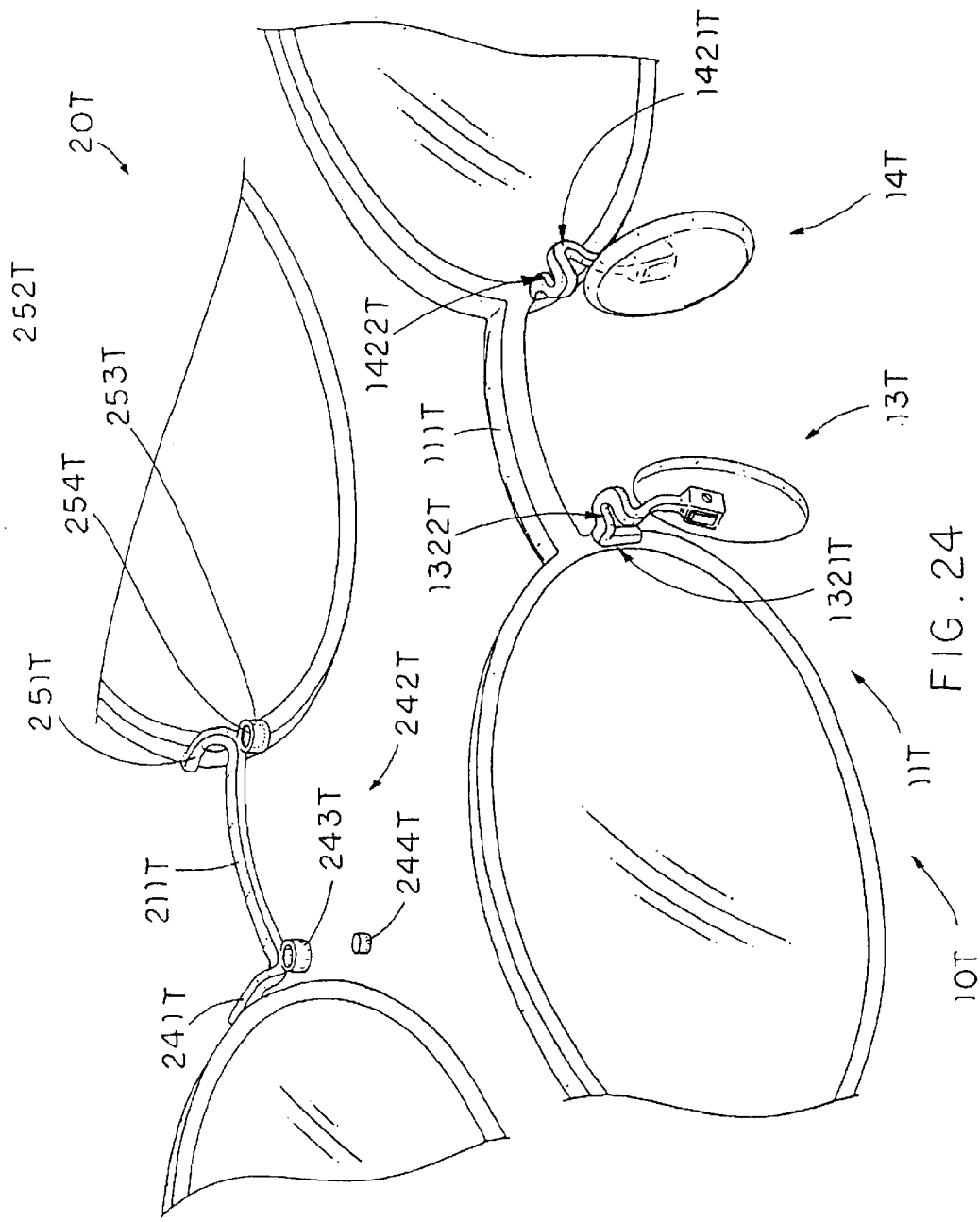

SPECTACLES SET WITH DETACHABLE MAGNETIC SHELTER FRAME

CROSS REFERENCE OF RELATED APPLICATIONS

This is a Continuation-In-Part application of another Continuation-In-Part application, application Ser. No. 10/648,126, filed Aug. 25, 2003, of a non-provisional application, application Ser. No. 10/278,497, filed Oct. 24, 2002 now U.S. Pat. No. 6,783,233.

BACKGROUND OF THE PRESENT INVENTION

1. Field of Invention

The present invention relates to a spectacle frame, and more particularly to a spectacles set, which comprises a detachable magnetic shelter frame adapted for detachably mounting in front of a primary spectacle frame by means of magnetic attraction.

2. Description of Related Arts

Shelter frames are widely used today. A conventional shelter frame, such as clip-on sunglasses, comprises a plurality of clipping claws for detachably mounted on a short-sighted or farsighted sunglasses so that the wearer does not need to carry and pay for another pair of shortsighted or farsighted sunglasses. However, the metal made clipping claws may scratch the lenses of the primary eyeglasses during the attaching operation. Also, the wearer requires both hands to align and engage the conventional clip-on sunglasses on the primary eyeglasses in correct position. It is troublesome and dangerous for a wearer to use his or her both hands to wear such clip-on sunglasses on the regular glasses while he or she is driving.

In order to solve the problem of the above mentioned clip-on sunglasses, magnetic attachment is recently introduced into the eyeglasses industry, such as U.S. Pat. Nos. 5,416,537, 5,568,207, 5,642,177, 5,737,054, and 5,975,691. For example, in U.S. Pat. No. 5,568,207, a primary pair of magnet members is affixed on two side extensions of a primary spectacle frame respectively. A shelter frame, such as sunglasses, includes a pair of arms for resting over the upper side extensions for preventing the shelter frame from moving downward relative to the primary spectacle for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Moreover, the magnet members are firmly affixed to the spectacle frame of the primary spectacle. Once the spectacle frame is accidentally bent its shape, the shelter frame may not precisely mounted on the primary spectacle by means of the magnet attachment. Furthermore, the spectacle frame of the primary spectacle must be altered to fit the magnet members thereto such that the magnet members will destroy the aesthetic appearance of the primary spectacle.

SUMMARY OF THE PRESENT INVENTION

A main object of the present invention is to provide a spectacles set which comprises a detachable shelter frame adapted for detachably mounting in front of a primary spectacle frame by means of magnetic attachment arrangement, so as to precisely interlock the detachable shelter frame with the primary spectacle frame.

Another object of the present invention is to provide a spectacles set wherein each of the nose supports of the primary spectacle frame is made of a kind of metal having magnetic attraction ability such that the primary spectacle frame does not require to change the original structural design to incorporate with the detachable shelter frame.

Another object of the present invention is to provide a spectacles set, wherein the detachable shelter frame adapted for precisely and easily mounting in front of the primary spectacle frame by means of magnetic attachment arrangement without the risk of scratching the lenses of the primary spectacle frame.

Another object of the present invention is to provide a spectacles set with detachable shelter frame, wherein the magnetic attachment arrangement is hidden behind the frame body of the primary spectacle frame and located at the nose supports of the primary spectacle frame so as to keep the aesthetic appearance of the primary spectacle frame.

Another object of the present invention is to provide a spectacles set with detachable shelter frame, wherein the nose supports are adapted to be adjusted their positions with respect to the primary spectacle frame in order to fit the wearer, the wearer may self-adjust the magnetic attachment arrangement to align with the detachable shelter frame even the shape of the primary spectacle frame is slightly distorted.

Another object of the present invention is to provide a spectacles set with detachable shelter frame, wherein two supporting arms of the magnetic attachment arrangement ride on the primary bridge of the primary spectacle, so as to support the detachable shelter frame and further prevent the downward and sideward movement of the detachable shelter frame with respect to the primary spectacle frame.

Another object of the present invention is to provide a spectacles set with detachable shelter frame, wherein the two supporting arms of the magnetic attachment arrangement are further extended downwardly to mount on the primary bridge of the primary spectacle so as to further prevent any frontward or rearward movement of the detachable shelter frame with respect to the primary spectacle frame.

Another object of the present invention is to provide a spectacles set, wherein the wearer may merely use one hand to attach or detach the detachable shelter frame during exercising or driving.

Another object of the present invention is to provide a spectacles set with detachable shelter frame, wherein no magnet is needed to embed into the primary spectacle frame such that no magnetic field is generated around the primary spectacle frame to affect the wearer's health while he or she normally wears the primary spectacle frame.

Accordingly, in order to accomplish the above objects, the present invention provides a spectacles set comprising a primary spectacle frame and a detachable shelter frame adapted for mounting in front of the primary spectacle frame.

The primary spectacle frame comprises a frame body for mounting a pair of lenses in position, wherein the frame body comprises a primary bridge connected between the two lenses, two nose supports each of which has magnetic attraction ability extended from two inner sides of the lenses respectively, and two side extensions provided at two outer sides of the lenses for coupling a pair of temples respectively.

The detachable shelter frame comprises a shelter frame for supporting two auxiliary lenses and a pair of magnetic attachment arrangements connected to the shelter frame, wherein each of the magnetic attachment arrangements comprises a supporting arm extending rearwardly from an inner side of the shelter frame towards the respective nose support and a magnetic seat which is connected to the supporting arm and extended to magnetically attach the respective nose support of the primary spectacle frame so as to securely hold the shelter frame in front of the primary spectacle frame.

In a preferred embodiment of the present invention, the shelter frame includes a shelter bridge connected between the two auxiliary lenses and each of the supporting arms of the magnetic attachment arrangements has a riding portion rearwardly extended from the shelter bridge for riding on the primary bridge of the primary spectacle frame and a mounting portion downwardly extended from the riding portion to support the magnetic seat thereof to attach with respective nose support of the primary spectacle frame.

These and other objectives, features, and advantages of the present invention will become apparent from the following detailed description, the accompanying drawings, and the appended claims.

BRIEF DESCRIPTION OF THE DRAWINGS

FIG. 1 is a perspective view of a spectacles set comprising a primary spectacle frame incorporated with a detachable shelter frame according to a first preferred embodiment of the present invention.

FIGS. 4 and 4A illustrate a second alternative mode of the spectacles set according to the above first preferred embodiment of the present invention.

FIGS. 5 and 5A illustrate a third alternative mode of the spectacles set according to the above first preferred embodiment of the present invention.

FIG. 18 is a perspective view of a spectacles set according to a sixth preferred embodiment of the present invention.

FIG. 24 illustrates an alternative mode of the spectacle set according to the above seventh preferred embodiment of the present invention.

DETAILED DESCRIPTION OF THE PREFERRED EMBODIMENT

Figure 1A:
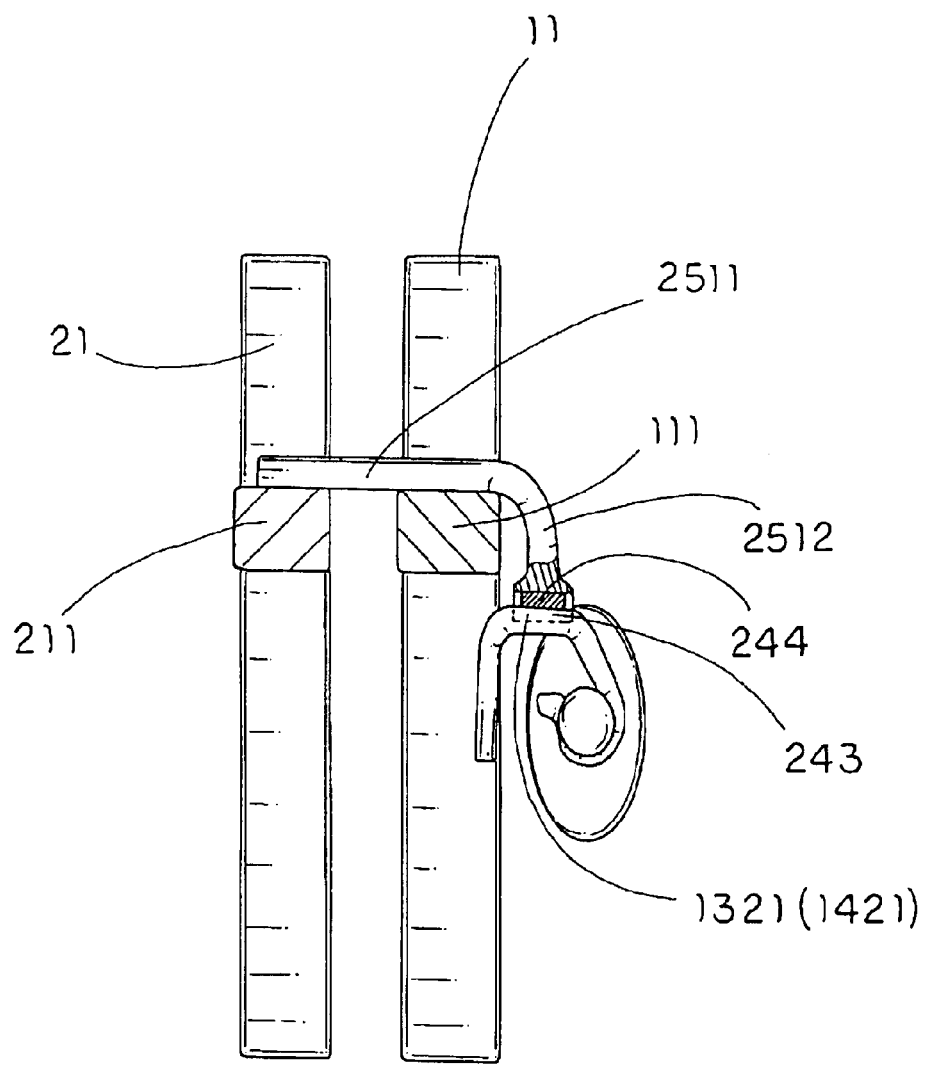
FIG. 1A is a sectional view of the spectacles set according to the above first preferred embodiment of the present invention.

Referring to FIG. 1 of the drawings, a spectacles set according to a first preferred embodiment of the present invention is illustrated, wherein the spectacles set comprises a primary spectacle frame 10 and a detachable shelter frame 20 adapted for mounting in front of the primary spectacle frame 10.

The primary spectacle frame 10, such as a conventional spectacle frame, comprises a frame body 11 for mounting a pair of lenses 121, 122 in position, wherein the frame body 11 comprises a primary bridge 111 connected between the two lenses 121, 122, two nose supports 13, 14 extended from two inner sides of the lenses 121, 122 respectively, and two side extensions provided at two outer sides of the lenses 121, 122 for coupling a pair of temples respectively.

Each of the nose supports 13, 14 comprises a supporting member 131, 141 and an extension arm 132, 142 which has a distal end portion extended from the supporting member 131, 141 and a root end portion extended from the inner side of the respective lens 121, 122, wherein each of the extension arms 132, 142 is made of a kind of metal having magnetic attraction ability, such as mild steel, low carbon steel and high grade steel, which is attractive to magnetic material such as permanent magnet.

According to the preferred embodiment, the two extension arms 132, 142 of the nose supports 13, 14 are integrally and rearwardly extended from the frame body 11 wherein each of the extension arms 132, 142 is bent to form a shoulder portion 1321, 1421 between the distal end portion and the root end portion. As shown in FIG. 1, each of the extension arms 132, 142 is made in reverse U-shape wherein the shoulder portion 1321, 1421 is formed at a top side of the respective extension arm 132, 142 to magnetically attract with the detachable shelter frame 20. In other words, the primary spectacle frame 10 does not require modifying its original structure for mounting the detachable shelter frame 20 thereon.

The frame body 11 of the primary spectacle frame 10 can be constructed as the conventional spectacle frame to have a pair of lens rims as shown in FIG. 1 or the rimless frame that the primary bridge 111 and the two side extensions 15, 16 are directly fastened to the edges of the two lenses 121, 122.

The detachable shelter frame 20 comprises a shelter frame 21 for supporting two auxiliary lenses 221, 222. The shelter frame 21 comprises a shelter bridge 211 extended between the two auxiliary lenses 221, 222 and a pair of magnetic attachment arrangements 24, 25 connected to the shelter frame 21 for holding the shelter frame 21 in front of the primary spectacle frame 10 in position.

As shown in FIGS. 1 and 1A, each of the magnetic attachment arrangements 24, 25 comprises a supporting arm 241, 251 extending rearwardly from an inner side of the shelter frame 21 towards the respective nose support 13, 14 and a magnetic seat 242, 252 which is connected to the supporting arm 241, 251 and extended to magnetically attach the respective nose support 13, 14 of the primary spectacle frame 10 so as to securely hold the shelter frame 21 of the detachable shelter frame 20 in front of the frame body 11 of the primary spectacle frame 10.

Each of the magnetic seats 242, 252 comprises a magnetic housing 243, 253 rearwardly extended from the respective supporting arm 241, 251 wherein each magnetic seat 242, 252 is made of non-magnetic material or soft-magnetic metal having magnetic attraction ability such as mild steel, low carbon steel and high grade steel and a magnet 244, 254 mounted in the magnetic housing 243, 253, which is arranged to face toward and align with the respective nose support 13, 14 of the frame body 11 when the detachable shelter frame 20 is mounted in front of the primary spectacle frame 10.

According to the preferred embodiment, the two supporting arms 241, 251 are in L-shaped and extended from two end portions of the shelter bridge 211, wherein each of the supporting arms 241, 251 comprises a riding portion 2411, 2511 rearwardly extended from the shelter bridge 211 to ride on the primary bridge 111 and a mounting portion 2412, 2512 downwardly and integrally extended from a rear end of the respective riding body 2411, so that the riding portions of the supporting arms 241, 251 are capable of substantially riding on the primary bridge 111 when the detachable shelter frame 20 is mounted in front of the primary spectacle frame 10 so as to support the detachable shelter frame 20 and further prevent any downward and sideward movement of the detachable shelter frame 20 with respect to the primary spectacle frame 10, as shown in FIG. 1A.

In other words, the two supporting arms 241, 251 function as a bridge clip to ride on top of the primary bridge 111 of the frame body 11 for engaging with the primary bridge 111 so as to securely interlock the shelter frame 21 of the detachable shelter frame 20 in front of the primary spectacle frame 10.

In addition, the two mounting portions 2412, 2512 of the two supporting arms 241, 251 of the magnetic attachment arrangement 24, 25 are further extended downwardly to mount on the primary bridge 111 of the primary spectacle frame 10 that may further prevent any frontward or rearward movement of the detachable shelter frame 20 with respect to the primary spectacle frame 10, so that besides the magnetic attachment between the two magnetic seats 242, 252 and the two magnetic holders 152, 162 respectively, the detachable shelter frame 20 can further be securely mounted and supported on the primary spectacle frame 10.

Figure 2:
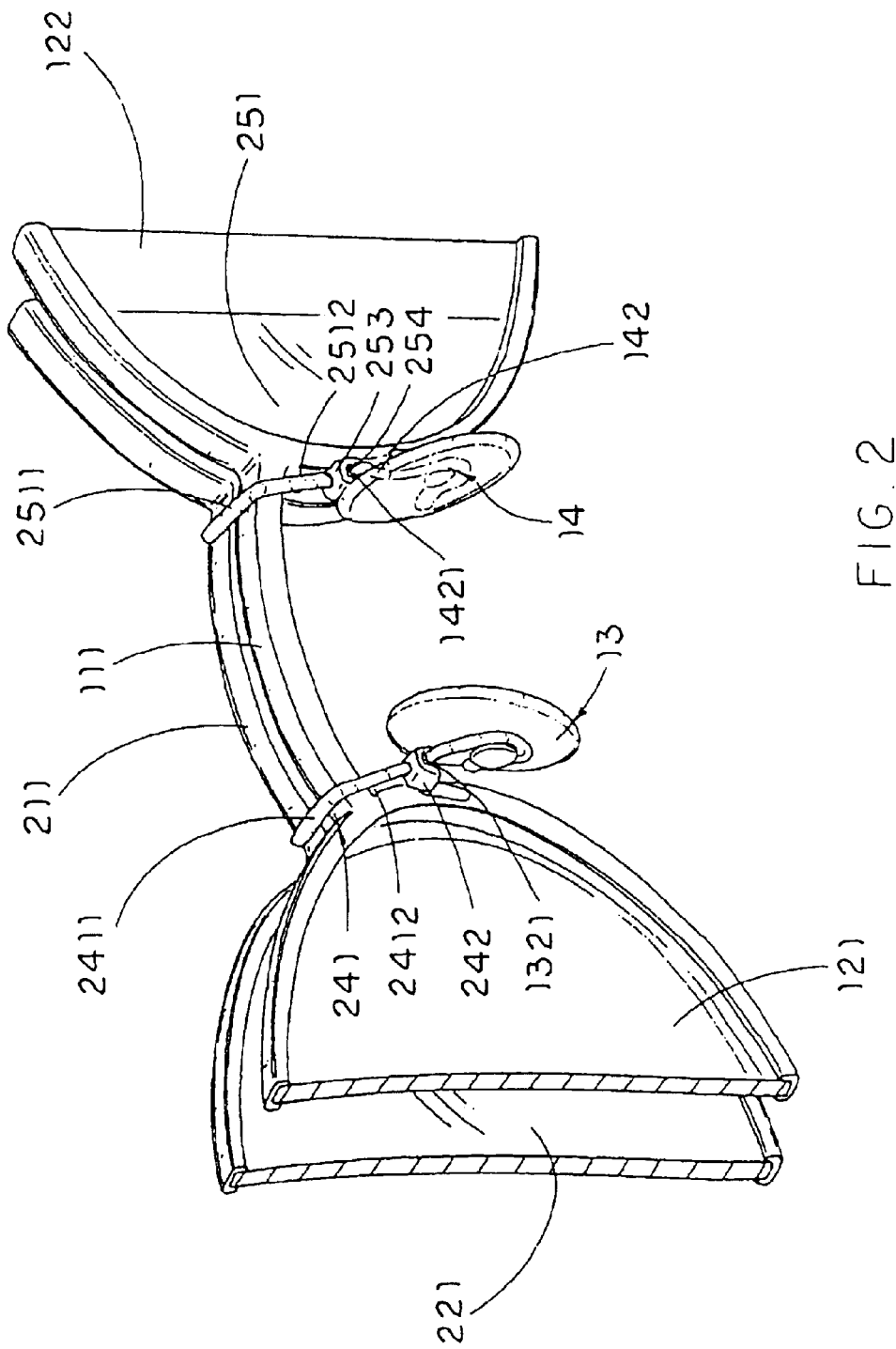
FIG. 2 is a perspective view of the spectacles set according to the above first preferred embodiment of present invention, illustrating the detachable shelter frame being mounted in front of the primary spectacle frame.

As shown in FIG. 2, the magnetic seats 242, 252 are connected to bottom ends of the mounting portions 2412, 2512 of the supporting arms 241, 251 respectively to magnetically attach to the shoulder portions 1321, 1421 of the extension arms 132, 142 of the nose supports 13, 14 respectively. Each of magnetic housings 243, 253, having a reverse U-shaped cross section, is downwardly and suspendedly affixed to the bottom (rear) end of the mounting portion 2412, 2512 of the respective supporting arm 241, 251.

Each magnet 244, 254 has a thickness smaller than a depth of the respective magnetic housing 243, 253 so as to define an engaging groove 245, 255, when the magnet 244, 254 is embedded in the magnetic housing 243, 253 for fittedly engaging with the respective shoulder portion 1321, 1421 of the respective nose support 13, 14. In other words, the engaging groove 245, 255 is defined between two sidewalls of the respective magnetic housing 243, 253.

In order to mount the detachable shelter frame 20 in front of the primary spectacle frame 10, the magnetic seats 242, 252 are respectively attached to the two nose supports 13, 14 by magnetically engaging the two shoulder portions 1321, 1421 of the extension arms 13, 14 in the two engaging grooves 245, 255 respectively. In addition, when the magnets 244, 254 are mounted in the magnetic housing 243, 253, the magnet field present around the two magnets 244, 254 not only guide the magnetic seats 242, 252 toward the align with the extension arms 132, 142 of the nose supports 13, 14 but also ensure the magnetic seats 242, 252 firmly attached with the extension arms 132, 142 of the nose supports 13, 14, as shown in FIG. 2.

Figure 3:
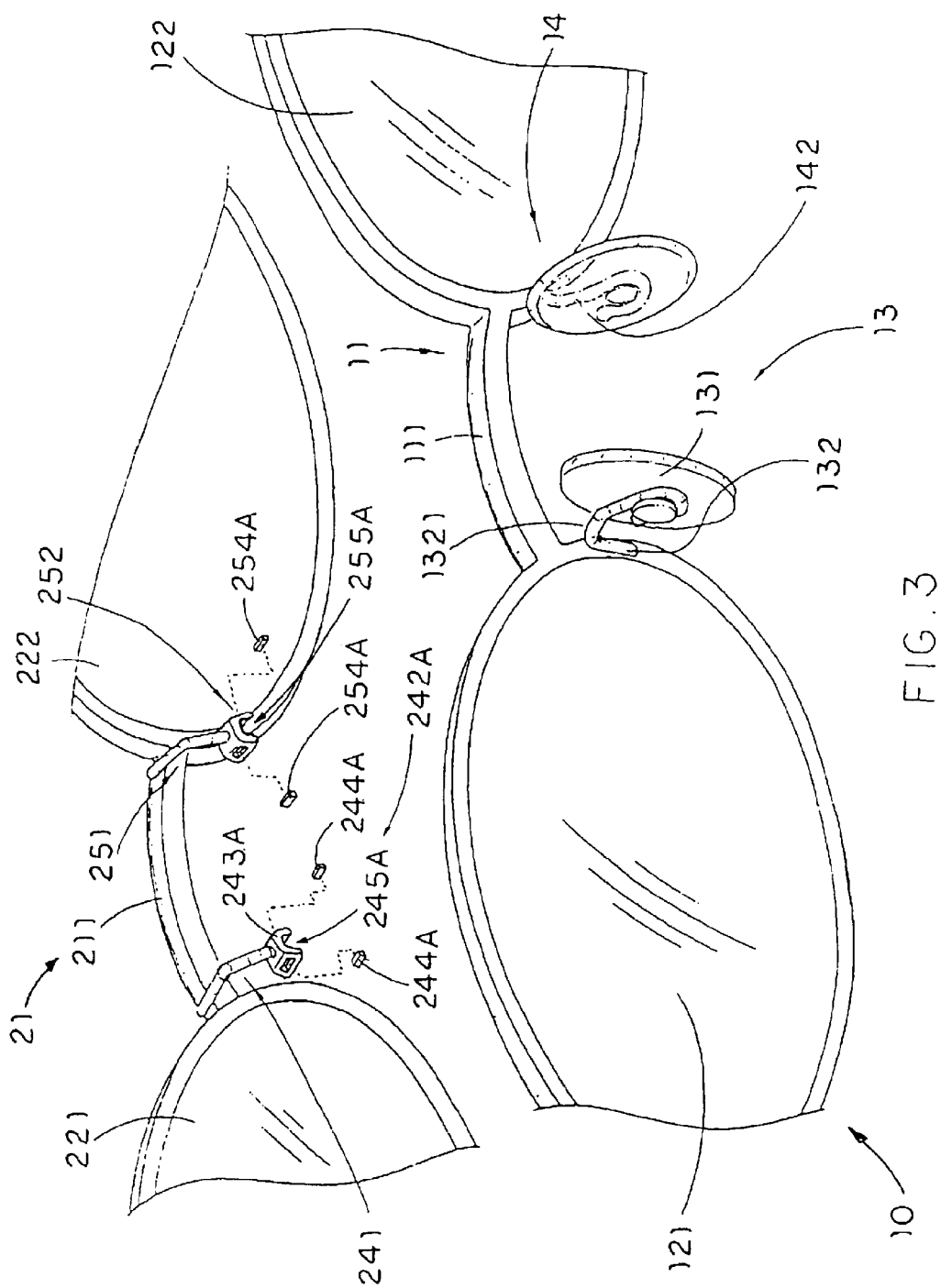
FIGS. 3, 3A, and 3B illustrate a first alternative mode of the spectacles set according to the above first preferred embodiment of the present invention.
Figure 3A:
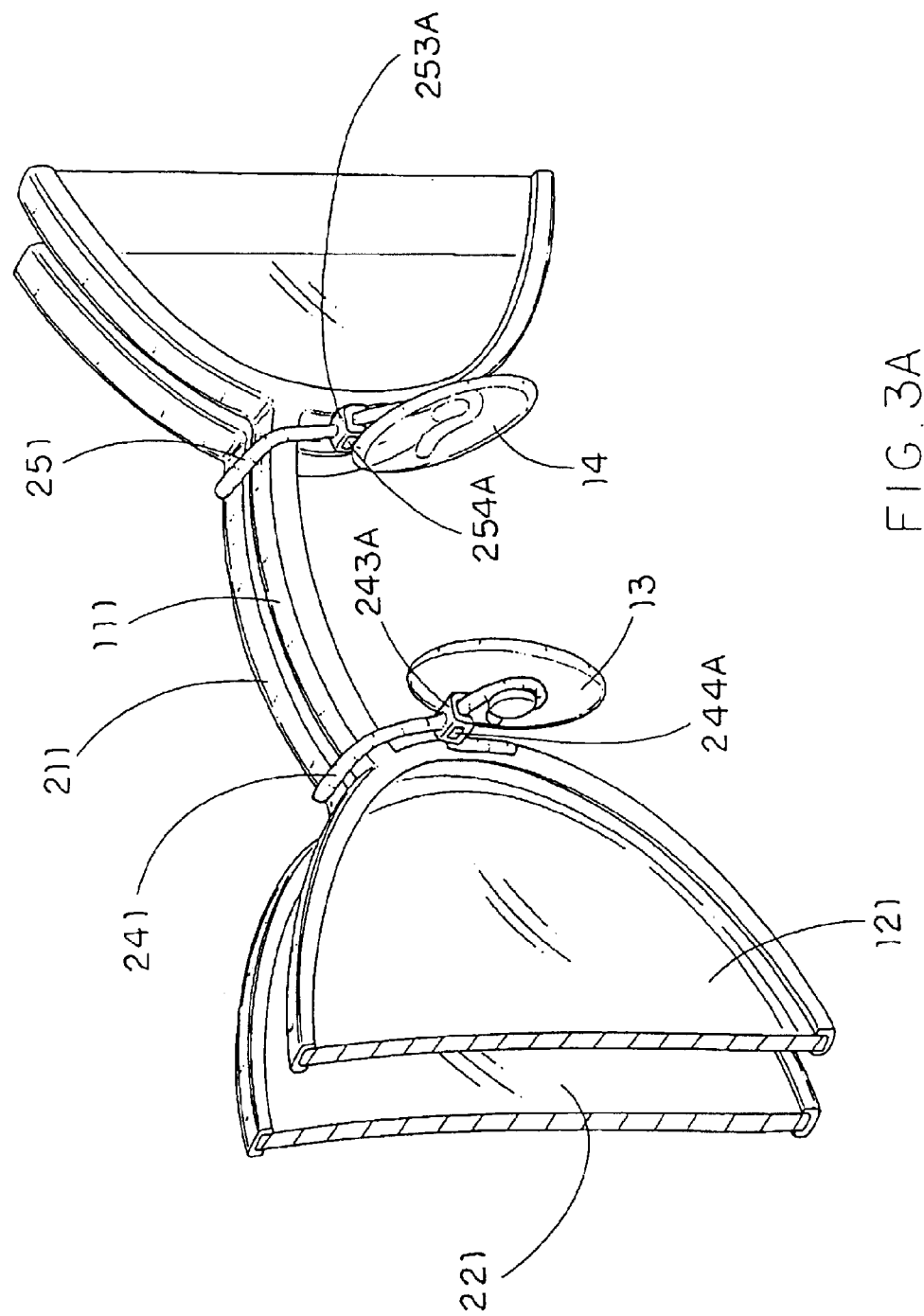
Figure 3B:
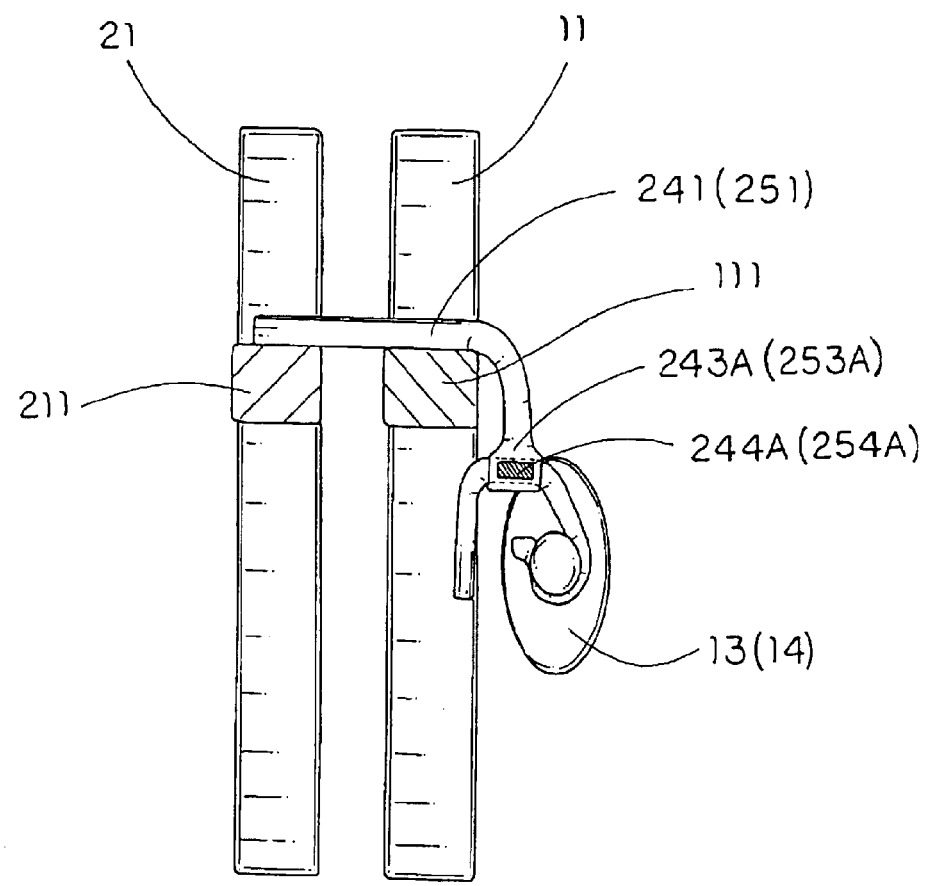

FIGS. 3, 3A and 3B illustrate a first alternative mode of the magnetic seat 242A, 252A wherein each of the magnetic seats 242A, 252A comprises a magnetic housing 243A, 253A extended from the bottom end of the respective supporting arm 241, 251 and two magnets 244A, 254A mounted in the magnetic housing 243A, 253A, which is arranged to face toward and align with the respective nose support 13, 14 of the frame body 11.

As shown in FIGS. 3, 3A and 3B, each of the magnetic housing 243A, 253A, having a reverse U-shaped cross section, is downwardly and suspendedly affixed to the bottom end of the respective supporting arm 241, 251, wherein the two magnets 244A, 254A are received at two sidewalls of the respective magnetic housing 243A, 253A to define an engaging groove 245A, 255A between the two sidewalls thereof. Accordingly, the two magnets 244A, 254A are embedded at two sidewalls of the respective magnetic housing 243A, 253A wherein the magnetic seats 242A, 252A are respectively attached to the two nose supports 13, 14 by magnetically engaging the two shoulder portions 1321, 1421 of the extension arms 13, 14 in the two engaging grooves 245A, 255A respectively.

Figure 4:
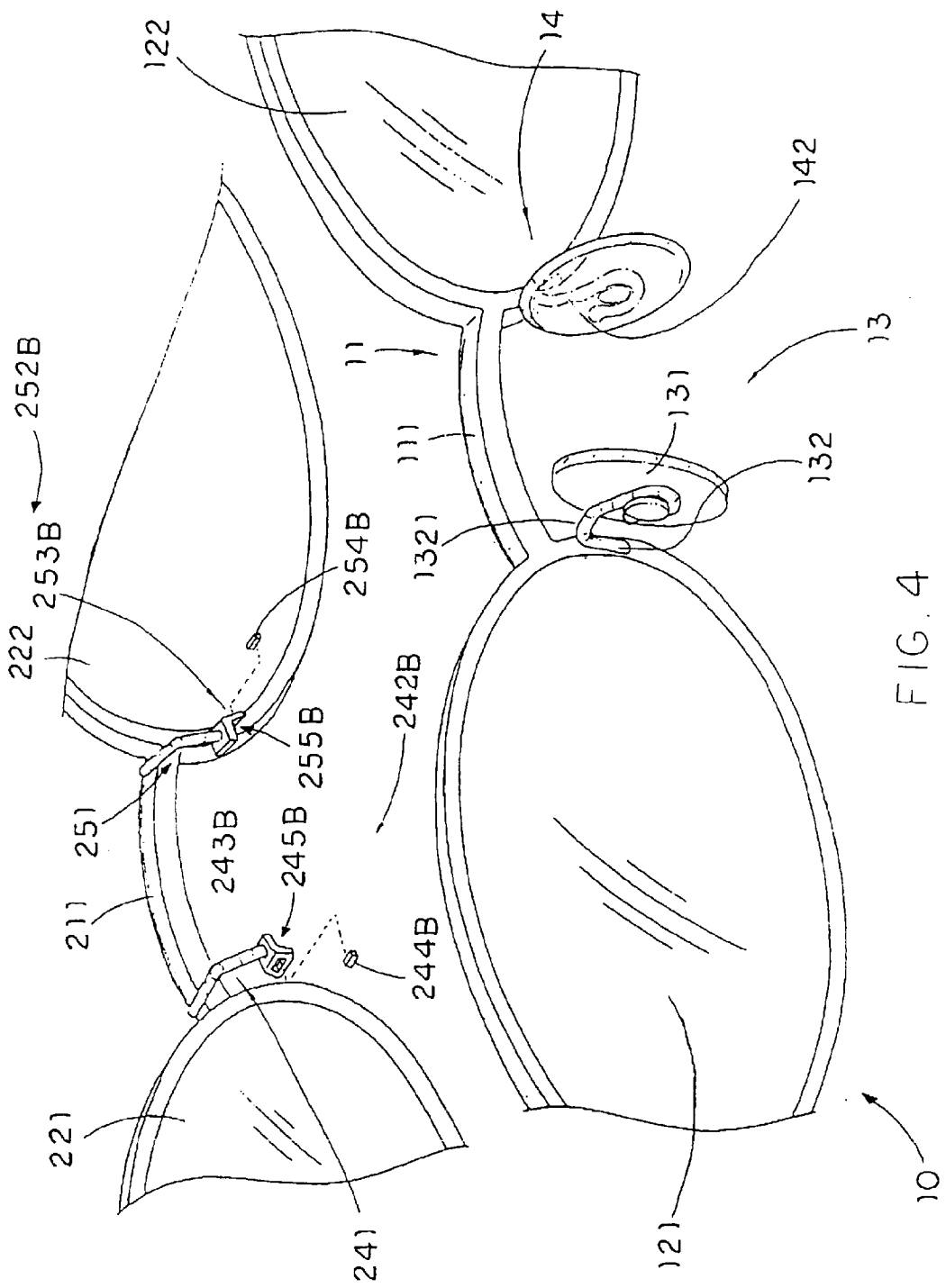

FIGS. 4 and 4A illustrate a second alternative mode of the magnetic seat 242B, 252B wherein each of the magnetic seats 242B, 252B comprises a magnetic housing 243B, 253B extended from the bottom end of the respective supporting arm 241, 251 and a magnet 244B, 254B mounted in the magnetic housing 243B, 253B, which is arranged to face toward and align with the respective nose support 13, 14 of the frame body 11.

As shown in FIG. 4, each of the magnetic housing 243B, 253B having a L-shaped cross section defines an outer sidewall to bias against an outer side of the shoulder portion 1321, 1421 of the respective nose support 13, 14, wherein the magnet 244B, 254B is received at the outer sidewall of the respective magnetic housing 243B, 253B to define an engaging groove 245B, 255B within an upper wall and the outer sidewall in such a manner that the magnetic seats 242B, 252B are respectively attached to the two nose support 13, 14 by magnetically engaging the two shoulder portions 1321, 1421 of the extension arms 13, 14 in the two engaging grooves 245B, 255B respectively.

Figure 5:
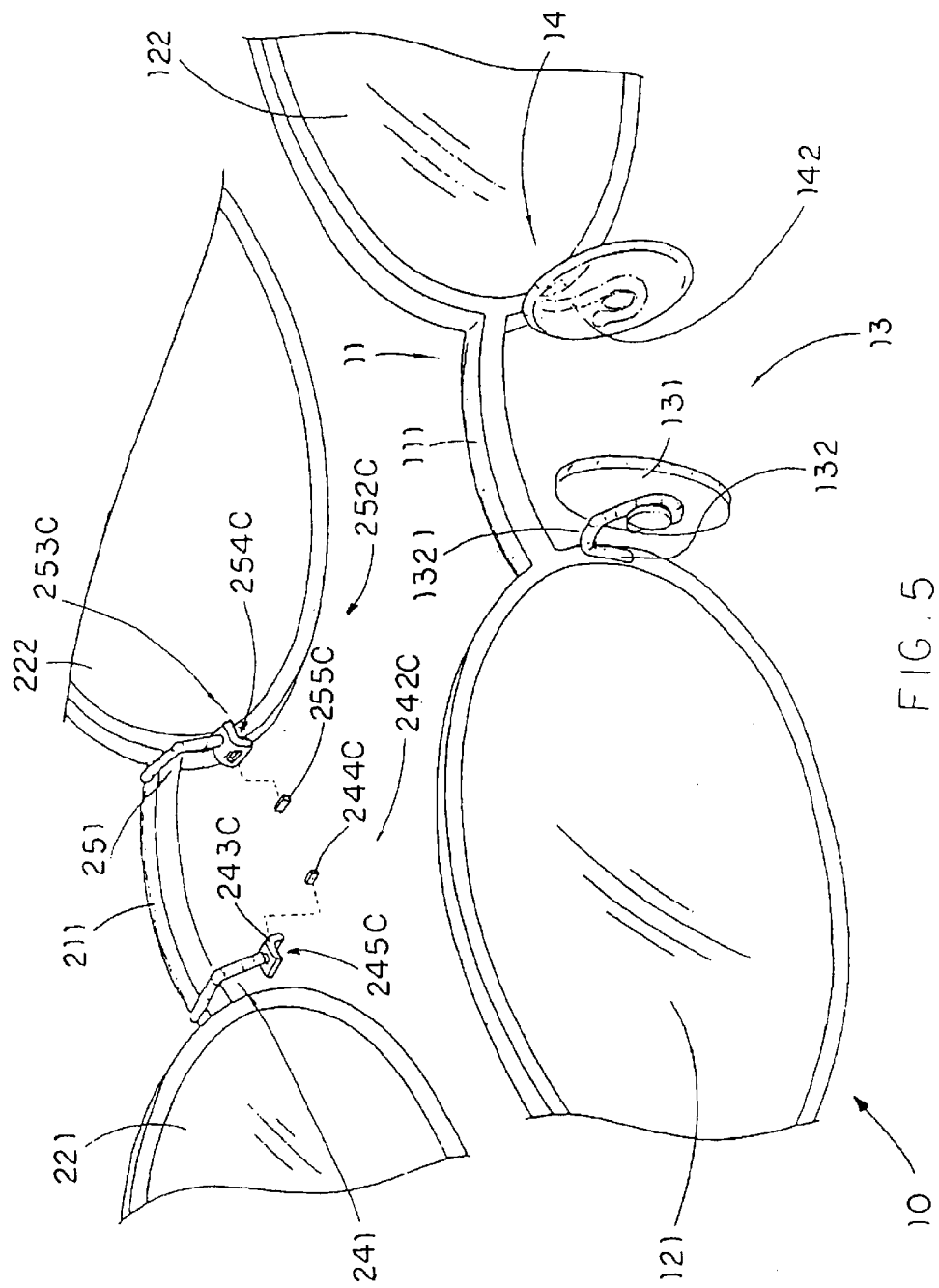

FIGS. 5 and 5A illustrates a third alternative mode of the magnetic seat 242C, 252C wherein each of the magnetic seats 242C, 252C comprises a magnetic housing 243C, 253C extended from the bottom end of the respective supporting arm 241, 251 and a magnet 244C, 254C mounted in the magnetic housing 243C, 253C, which is arranged to face toward and align with the respective nose support 13, 14 of the frame body 11.

As shown in FIG. 5, each of the magnetic housing 243C, 253C having a L-shaped cross section defines an inner sidewall to bias against an inner side of the shoulder portion 1321, 1421 of the respective nose support 13, 14, wherein the magnet 244C, 254C is received at the outer sidewall of the respective magnetic housing 243C, 253C to define an engaging groove 245C, 255C within an upper wall and the inner sidewall in such a manner that the magnetic seats 242C, 252C are respectively attached to the two nose support 13, 14 by magnetically engaging the two shoulder portions 1321, 1421 of the extension arms 13, 14 in the two engaging grooves 245C, 255C respectively, as shown in FIG. 5A.

Figure 6:
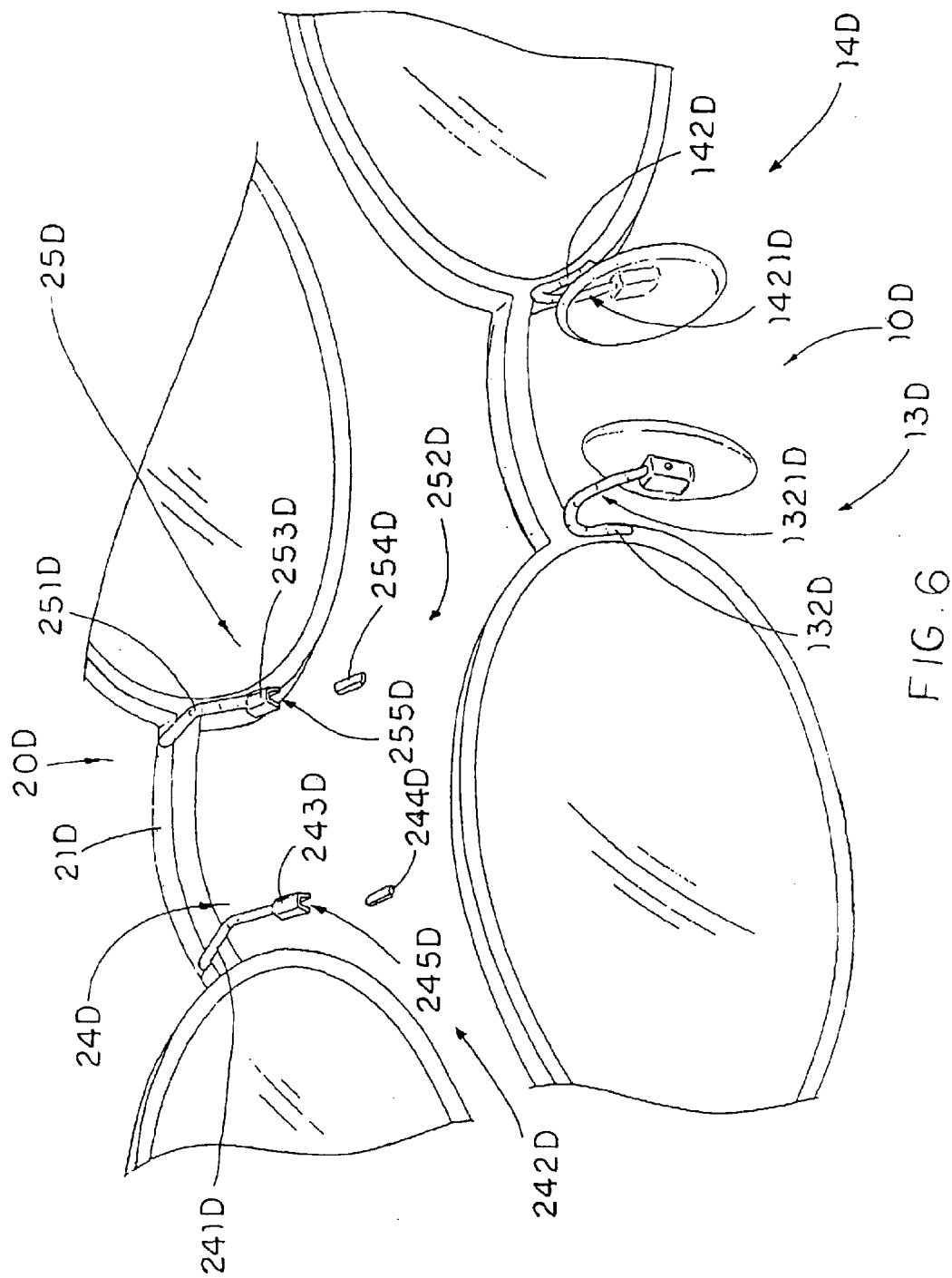
FIG. 6 illustrates a fourth alternative mode of the spectacles set according to the above first preferred embodiment of the present invention.

FIG. 6 illustrates a fourth alternative mode of the magnetic seat 242D, 252D, wherein the shoulder portion 1321D, 1421D is formed at a rear side of the respective extension arm 132D, 142D to magnetically attract with the detachable shelter frame 20D.

Each of the magnetic seats 242D, 252D comprises a magnetic housing 243D, 253D rearwardly extended from the respective supporting arm 241D, 251D and a magnet 244D, 254D mounted in the magnetic housing 243D, 253D, which is arranged to face toward and align with the shoulder portion 1321D, 1421D of the respective nose support 13D, 14D of the frame body 11D when the detachable shelter frame 20D is mounted in front of the primary spectacle frame 10D.

Each magnet 244D, 254D has a thickness smaller than a depth of the respective magnetic housing 243D, 253D so as to define an engaging groove 245D, 255D facing frotnwardly when the magnet 244D, 254D is embedded in the magnetic housing 243D, 253D for fittedly engaging with the respective shoulder portion 1321D, 1421D of the respective nose support 13D, 14D, such that the magnetic seats 242D, 252D are respectively attached to the two nose supports 13D, 14D by magnetically engaging the two shoulder portions 1321D, 1421D of the extension arms 13D, 14D in the two engaging grooves 245D, 255D respectively.

As shown in FIG. 6, each of the extension arms 132D, 142D is bent to form the shoulder portion 1321D, 1421D at an inclined manner wherein each of the supporting arms 241D, 251D is rearwardly extended from the shelter frame 21D to inclinedly support the magnetic seat 242D, 252D with respect to the shoulder portion 1321D, 1421D of the nose support 13D, 14D.

It is worth to mention that each of the magnetic seats 242D, 252D can be modified its structure as shown in FIGS. 3, 4, and 5 in order to magnetically engage the magnetic seats 242D, 252D with the shoulder portions 1321D, 1421D of the nose supports 13D, 14D respectively.

Figure 7:
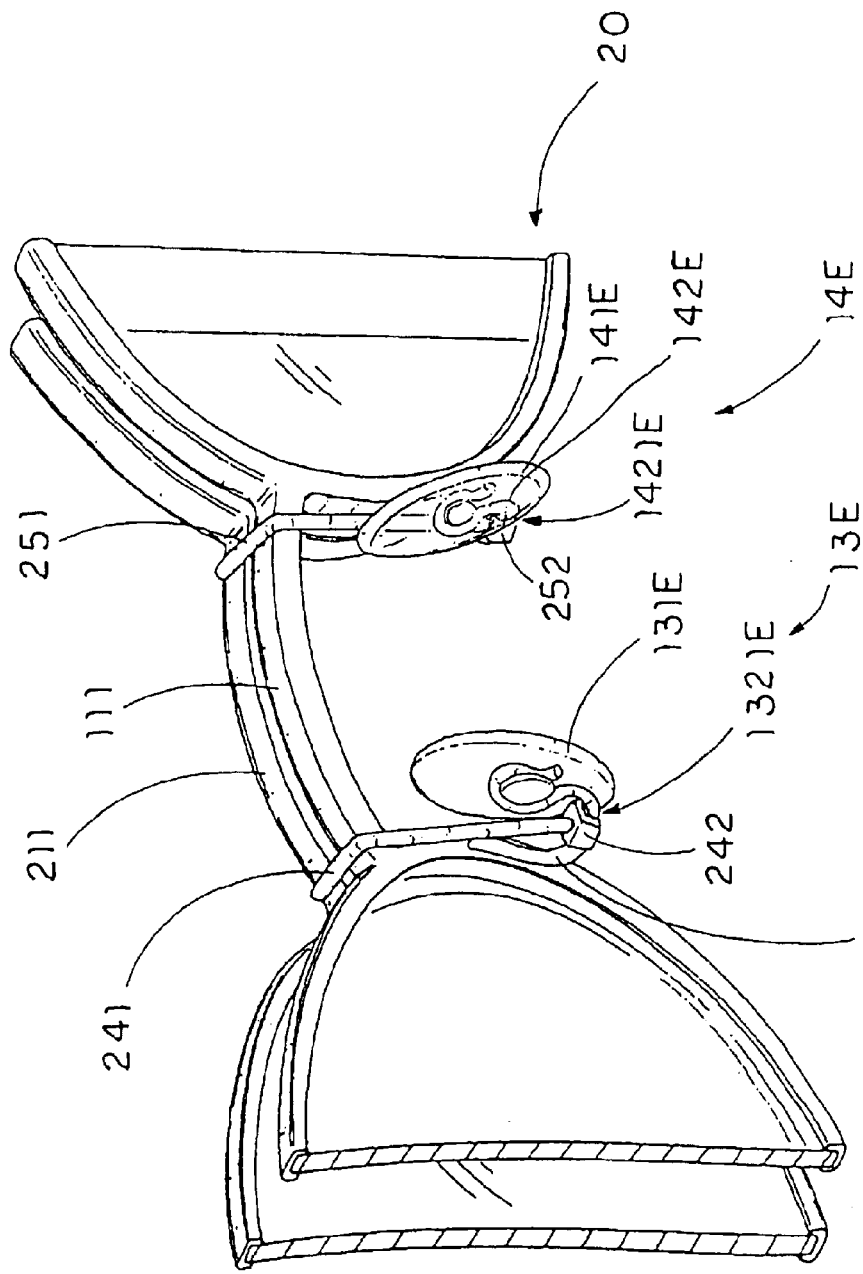
FIGS. 7 and 7A illustrate a fifth alternative mode of the spectacles set according to the above first preferred embodiment of the present invention.
Figure 7A:
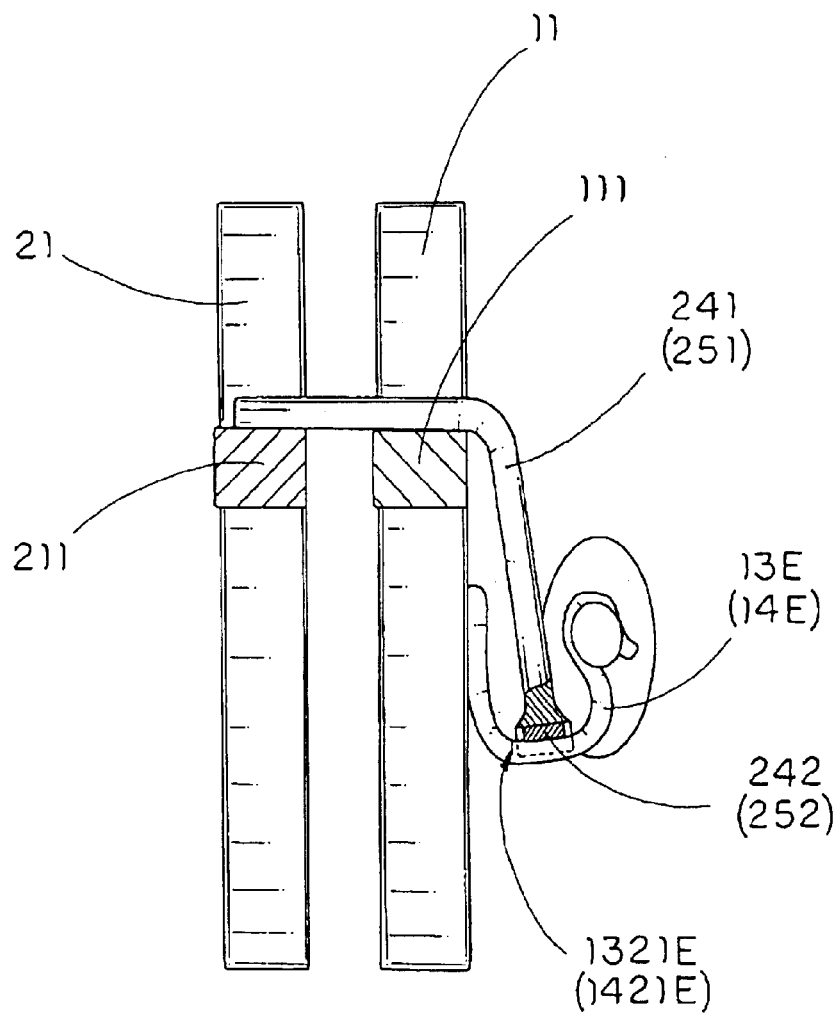

FIG. 7 illustrates a fifth alternative mode of the spectacles set according to the preferred embodiment, wherein each extension arm 132E, 142E of the nose supports 13E, 14E is made in U-shape to connect the supporting member 131E, 141E with the frame body 11. The shoulder portion 1321E, 1421E is formed at a lower side of the respective extension arm 132E, 142E to magnetic attract with the detachable shelter frame 20, as shown in FIG. 7A. Accordingly, each of the magnetic seats 242, 252 can be modified to form a structure, as shown in FIGS. 1, 3, 4, and 5, to magnetically engage with the shoulder portion 1321E, 1421E of the respective nose support 13E, 14E.

Figure 8:
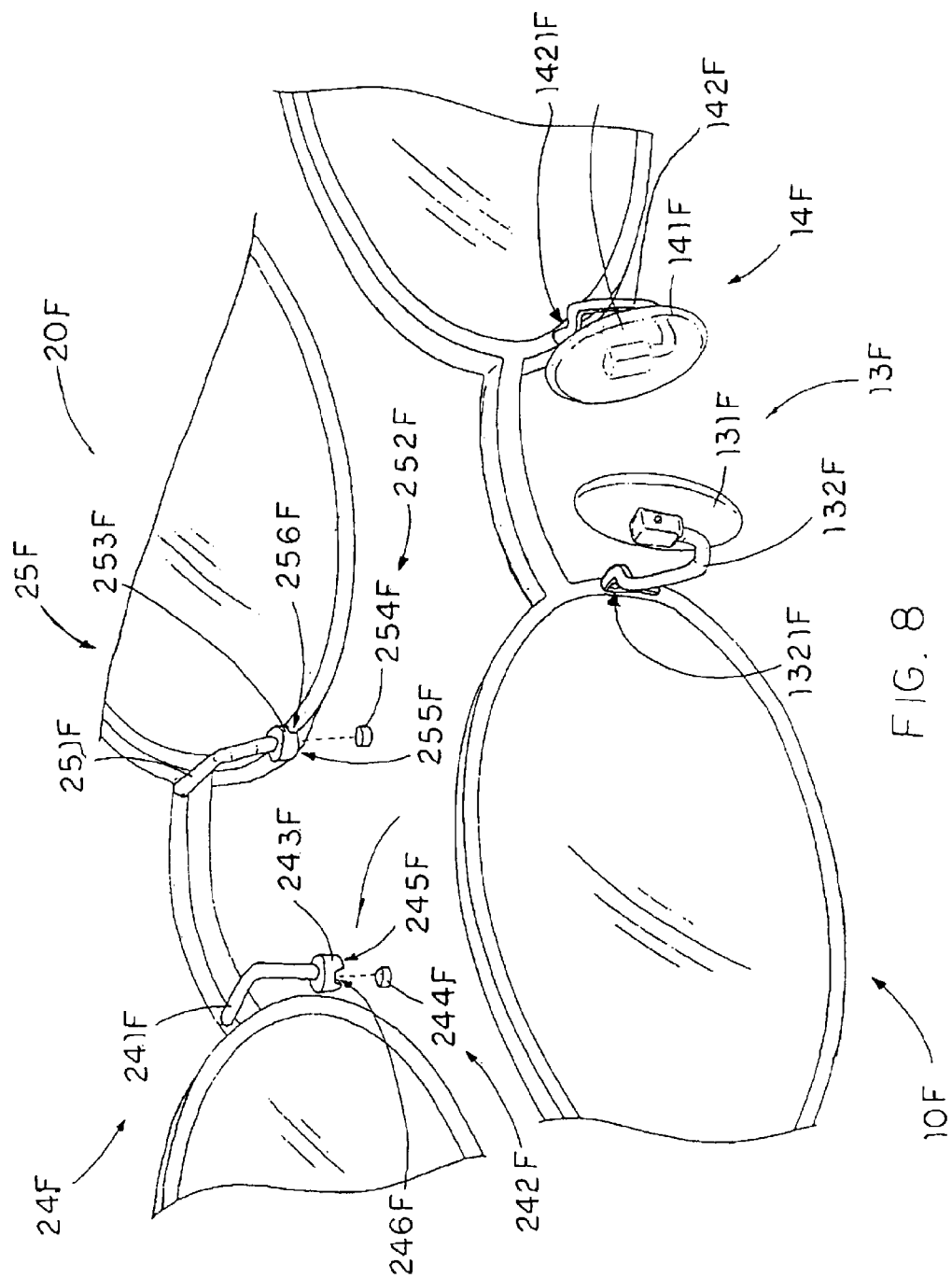
FIG. 8 is a perspective view of a spectacles set according to a second preferred embodiment of the present invention.

As shown in FIG. 8, a spectacles set according to a second embodiment illustrates an alternative mode of the first embodiment and its alternative modes, wherein the primary spectacle frame 10F and the detachable shelter frame 20F have the similar structural components as shown in the first embodiment, expect the nose supports 13F, 14F and the magnetic seats 242F, 252F.

Figure 9:
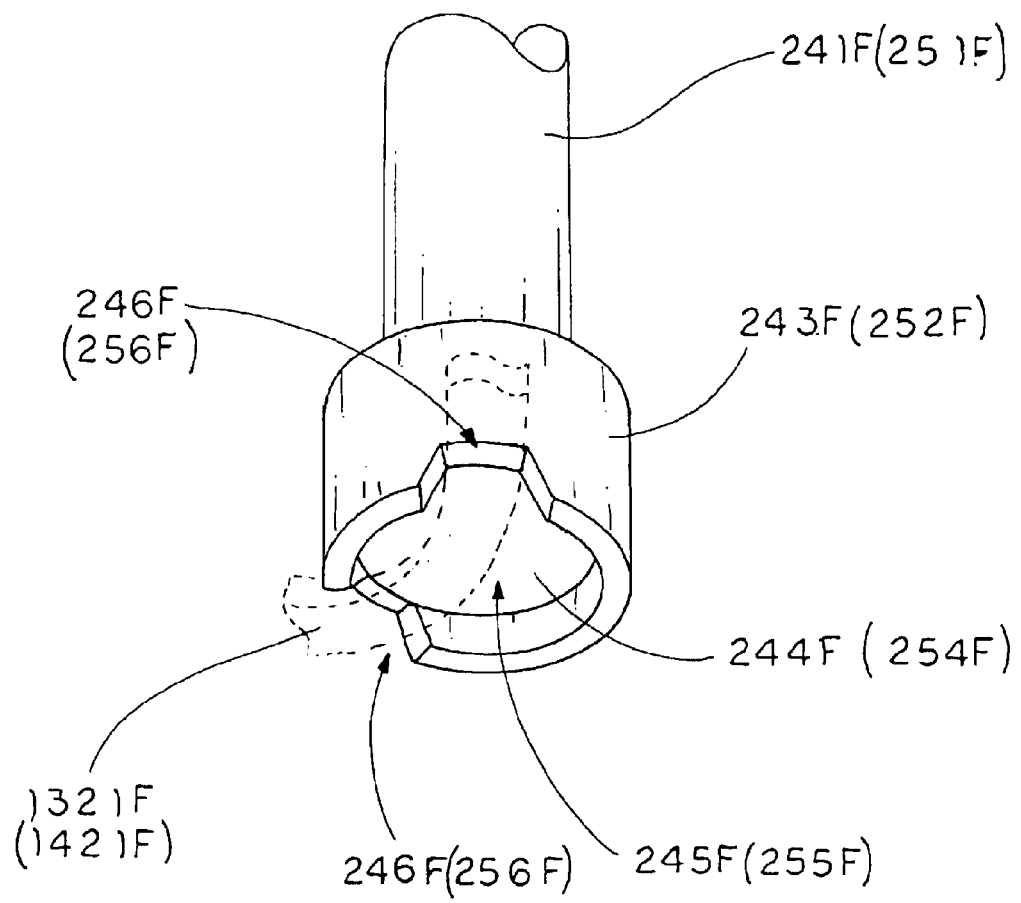
FIG. 9 is a perspective view of the magnetic attachment arrangement of the spectacles set according to the above second preferred embodiment of the present invention.

As shown in FIGS. 8 and 9, each of the nose supports 13F, 14F comprises a supporting member 131F, 141F and an extension arm 132F, 142F which has a distal end portion extended from the supporting member 131F, 141F and a root end portion extended from the inner side of the respective lens 121F, 122F, wherein each of the extension arm 132F, 142F is made of a kind of metal having magnetic attraction ability, such as mild steel, low carbon steel and high grade steel, which is attractive to magnetic material such as permanent magnet. Each of the extension arms 132F, 142F is bent to form an angled neck portion 1321F, 1421F between the distal end portion and the root end portion.

Each of the magnetic seats 242F, 252F comprises a magnetic housing 243F, 253F rearwardly extended from the respective supporting arm 241F, 251F wherein each magnetic seat 242F, 252F is made of non-magnetic material or soft-magnetic metal having magnetic attraction ability such as mild steel, low carbon steel and high grade steel and a magnet 244F, 254F mounted in the magnetic housing 243F, 253F, which is arranged to face toward and align with the respective nose support 13F, 14F of the frame body 11F when the detachable shelter frame 20F is mounted in front of the primary spectacle frame 10F.

Each magnet 244F, 254F has a thickness smaller than a depth of the respective magnetic housing 243F, 253F to define an engaging groove 245F, 255F within an surrounding wall of the magnetic housing 243F, 253F and a bottom side of the magnet 244F, 254F when the magnet 244F, 253F is embedded in the magnetic housing 243F, 253F for magnetically engaging with the angled neck portion 1321F, 1421F of the respective nose support 13F, 14F.

As shown in FIG. 9, each of the magnetic housings 243F, 253F further has at least an edge opening 246F, 256F formed at the surrounding wall to communicate with the engaging groove 245F, 255F for fittedly interlocking with the angled neck portion 1321F, 1421F of the respective nose support 13F, 14F. In other words, the detachable shelter frame 20F is securely mounted in front of the primary spectacle frame 10F by not only magnetically mounting the magnetic seats 242F, 252F on the nose supports 13F, 14F within the engaging grooves 245F, 255F respectively but also interlocking the angled neck portions 1321F, 1421F of the nose support 13F, 14F with the edge opening 246F, 256F. In addition, the supporting arms 241F, 251F are arranged to ride on the primary bridge 111 of the frame body 11F to further interlock the detachable shelter frame 20F in front of the primary spectacle frame 10F.

It is worth to mention that the width of the edge opening 246F, 256F is gradually reduced towards the engaging groove 245F, 255F such that when the detachable shelter frame 20F is mounted in front of the primary spectacle frame 10F, the edge opening 246F, 256F substantially guides the angled neck portion 1321F, 1421F of the nose support 13F, 14F to engage with the engaging groove 245F, 255F of the magnetic seat 242F, 252F. In other words, the structure of the edge opening 246F, 256F is adapted to self-adjust the alignment between the nose support 13F, 14F and the magnetic seat 242F, 252F so as to enhance the engagement between the detachable shelter frame 20F and primary spectacle frame 10F.

Figure 10:
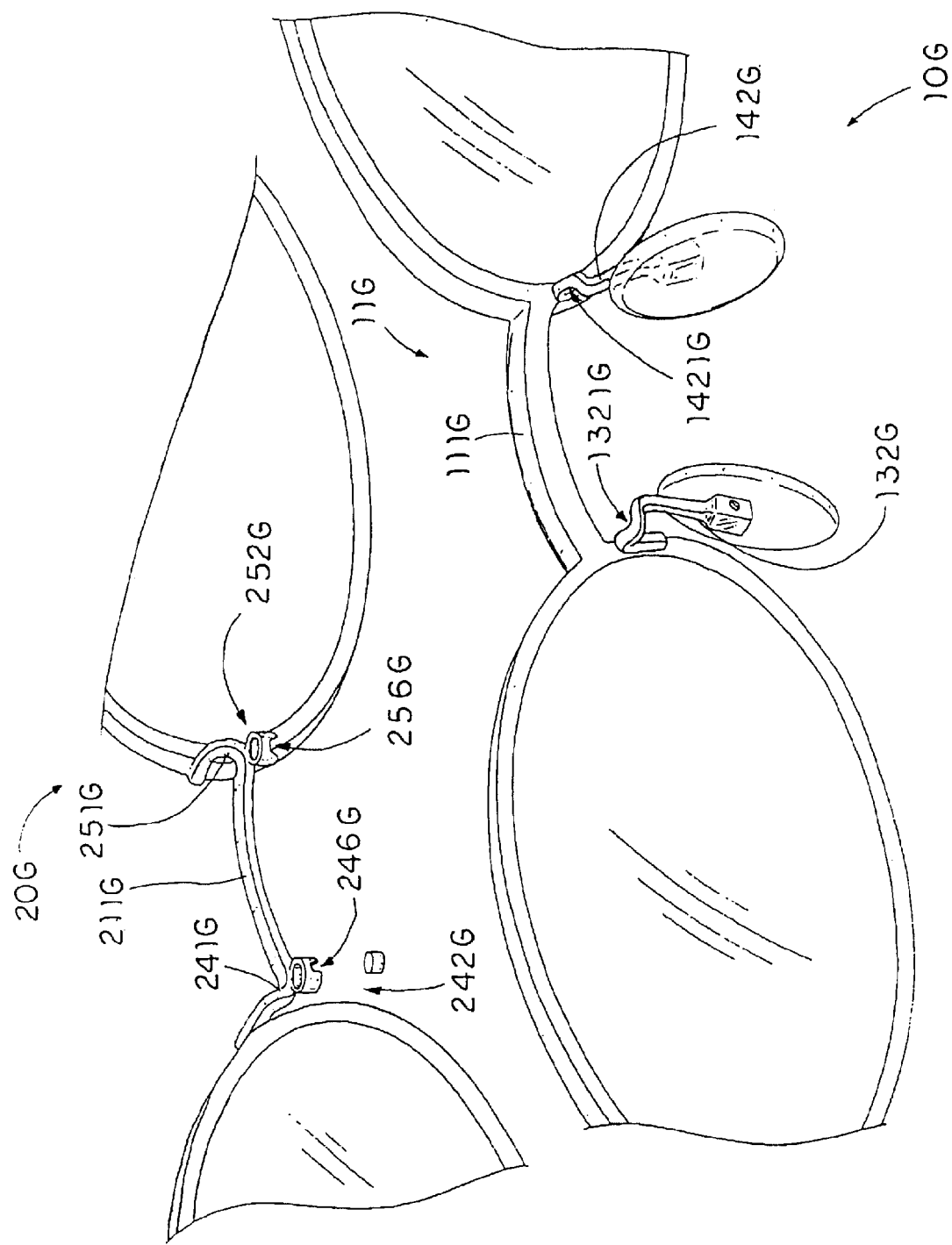
FIG. 10 illustrates an alternative mode of the spectacles set according to the above second preferred embodiment of the present invention.

FIG. 10 illustrates an alternative mode of the spectacles set according to the second embodiment, wherein the supporting arms 241G, 251G are constructed to form the shelter bridge 211F for riding on the primary bridge 111G of the frame body 11G to interlock the detachable shelter frame 20G in front of the primary spectacle frame 10G.

Accordingly, each of the extension arms 132F, 142F is bent outwardly to form the angled neck portion 1321F, 1421F to fittedly engage with the edge opening 246F, 256F of the respective magnetic seat 242F, 252F as shown in FIG. 9. Correspondingly, each of the extension arms 132G, 142G can be modified to bend inwardly to form the angled neck portion 1321G, 1421G not only to magnetically attach to the respective magnetic seat 242G, 252G but also to fittedly engage with the edge opening 246G, 256G of the respective magnetic seat 242G, 252G, as shown in FIG. 10.

Figure 11:
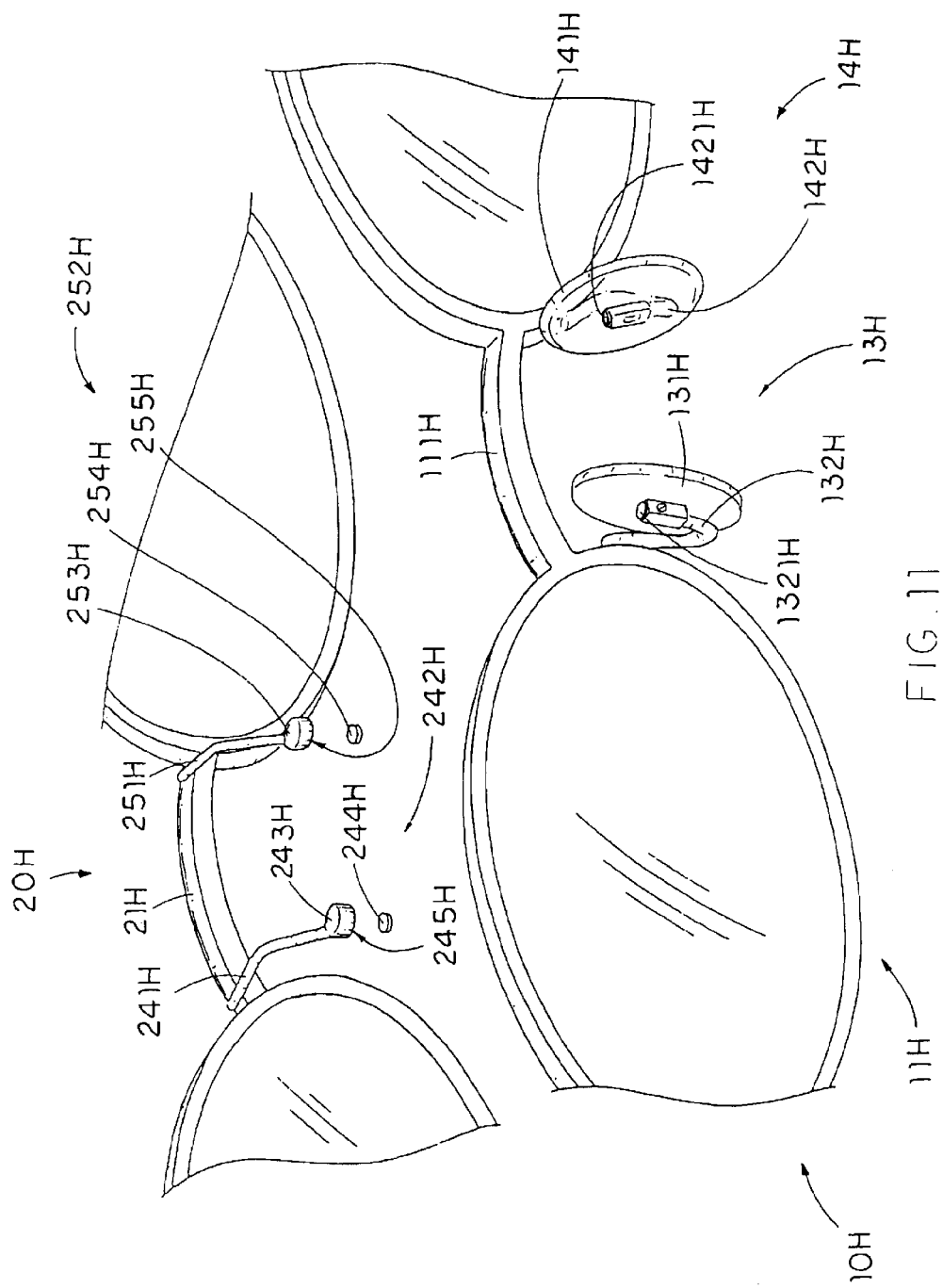
FIG. 11 is a perspective view of a spectacles set according to a third preferred embodiment of the present invention.

As shown in FIG. 11, a spectacles set according to a third embodiment illustrates another alternative mode of the first and second embodiments, which has a similar structure of the above the first and second embodiments and their alternative modes except the nose supports 13H, 14H.

Each of the nose supports 13H, 14H comprises a supporting member 131H, 141H and an extension arm 132H, 142H which has a distal end portion extended from the supporting member 131H, 141H and a root end portion extended from the inner side of the respective lens 121H, 122H, wherein each of the extension arm 132H, 142H is made of a kind of metal having magnetic attraction ability, such as mild steel, low carbon steel and high grade steel, which is attractive to magnetic material such as permanent magnet.

Figure 11A:
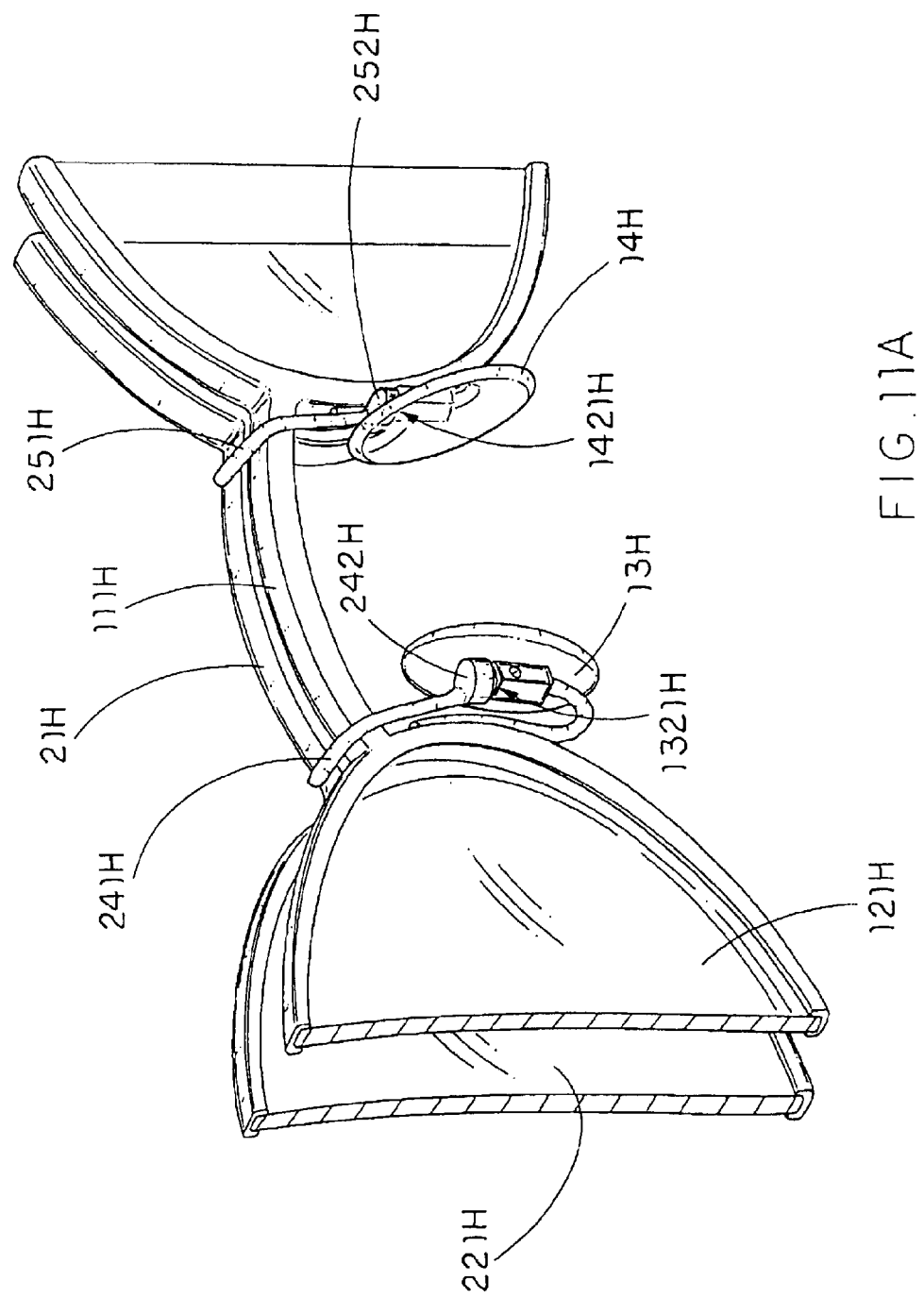
FIG. 11A is a perspective view of the spectacles set according to the above third preferred embodiment of the present invention, illustrating the detachable shelter frame being mounted in front of the primary spectacle frame.

Each of the magnetic attachment arrangements 24H, 25H comprises a supporting arm 241H, 251H extending rearwardly from an inner side of the shelter frame 21H towards the respective nose support 13H, 14H for riding on the primary bridge 111H of the frame body 11H and a magnetic seat 242H, 252H which is connected to the supporting arm 241H, 251H and extended to magnetically attach the respective nose support 13H, 14H of the primary spectacle frame 10H so as to securely hold the shelter frame 21H of the detachable shelter frame 20H in front of the frame body 11H of the primary spectacle frame 10H, as shown in FIG. 11A.

Each of the magnetic seats 242H, 252H comprises a magnetic housing 243H, 253H rearwardly extended from the respective supporting arm 241H, 251H wherein each magnetic seat 242H, 252H is made of non-magnetic material or soft-magnetic metal having magnetic attraction ability such as mild steel, low carbon steel and high grade steel and a magnet 244H, 254H mounted in the magnetic housing 243H, 253H, which is arranged to face toward and align with the respective nose support 13H, 14H of the frame body 11H when the detachable shelter frame 20H is mounted in front of the primary spectacle frame 10H.

Each magnet 244H, 254H has a thickness smaller than a depth of the respective magnetic housing 243H, 253H so as to define an engaging groove 245H, 255H, when the magnet 244H, 254H is embedded in the magnetic housing 243H, 253H for fittedly engaging with the respective distal end portion of the respective nose support 13H, 14H.

Figure 12:
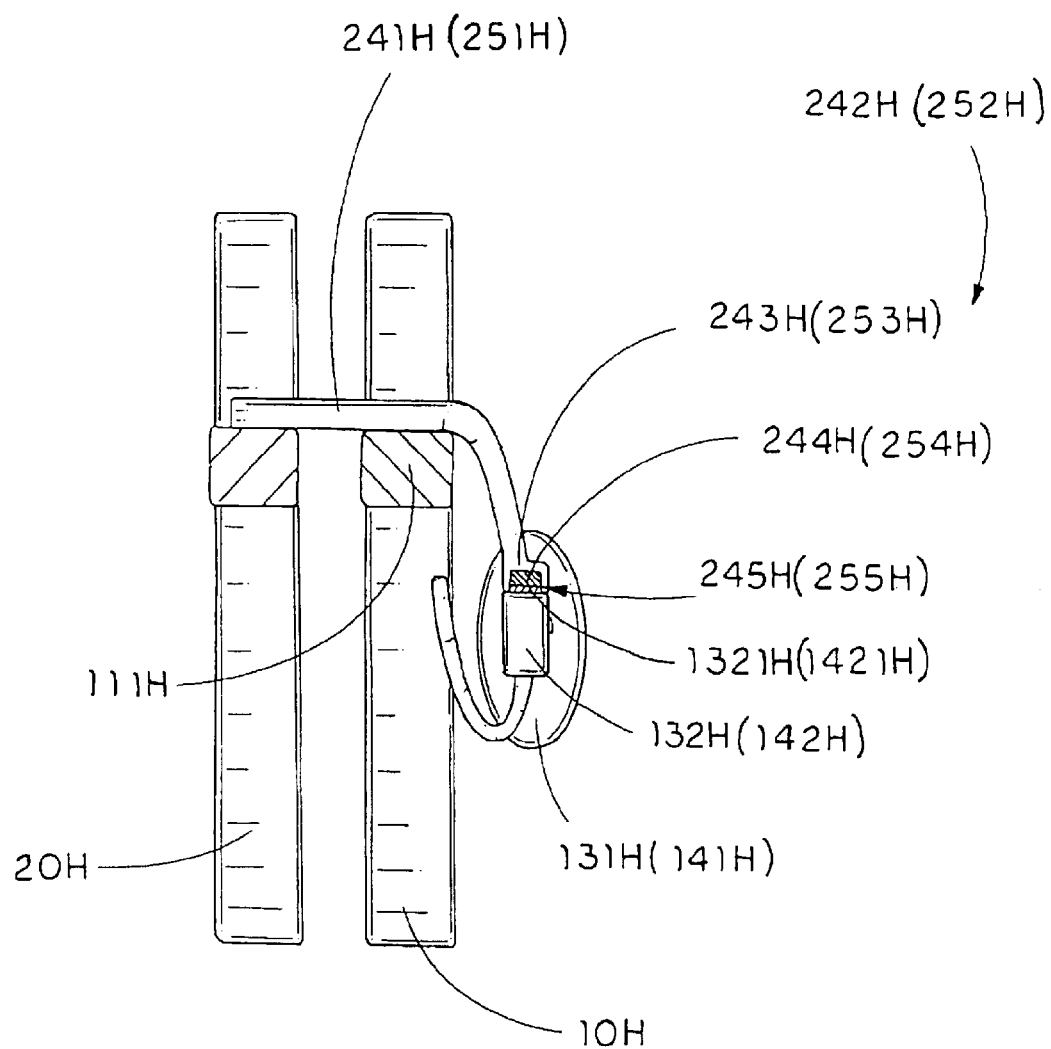
FIG. 12 is a sectional view of the spectacles set according to the above third preferred embodiment of the present invention, illustrating the detachable shelter frame being mounted in front of the primary spectacle frame.

It is worth to mention that the distal end portion of each of the extension arms 132H, 142H forms as an engaging member 1321H, 1421H fittedly received in the engaging groove 245H, 255H of the respective magnetic seat 242H, 252H so as to alignedly guide the magnetic seats 242H, 252H to magnetically engage with the extension arms 132H, 142H respectively, as shown in FIG. 12.

Figure 13:
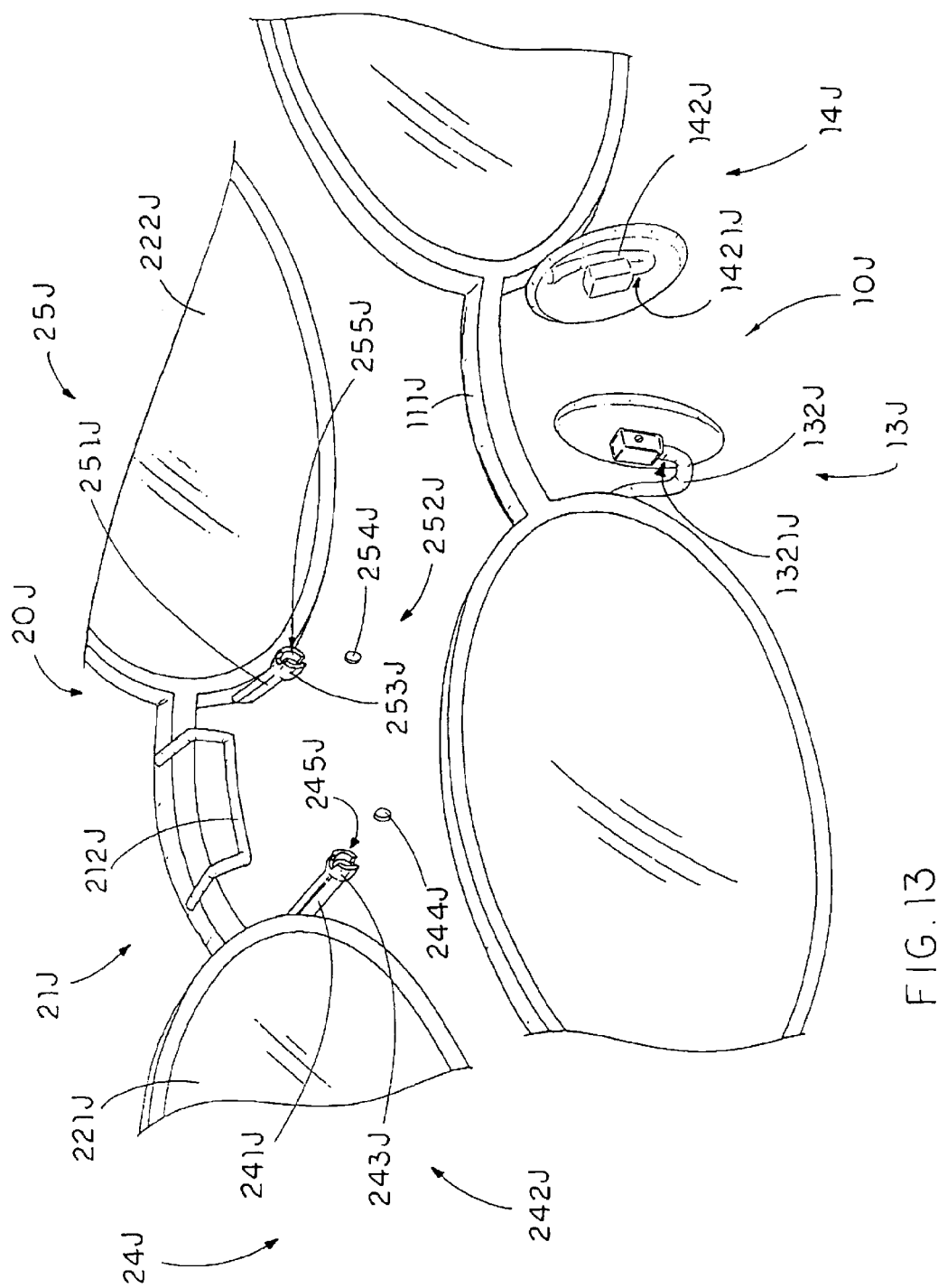
FIG. 13 illustrates a first alternative mode of the spectacles set according to the above third preferred embodiment of the present invention.

FIG. 13 illustrates a first alternative mode of the spectacles set according to the first, second, third embodiments and their alternative modes, wherein the two supporting arms 241J, 251J are rearwardly extended from two lower portions of two inner sides of the shelter frame 21J respectively towards the extension arms 132J, 142J.

Each of magnetic housings 243J, 253J, having a U-shaped cross section, is rearwardly and suspendedly affixed to the rear end of the respective supporting arm 241J, 251J to fittedly engage with the shoulder portion 1321J, 1421J of the respective extension arm 132J, 142J at a position between a distal end portion and a root end portion.

As shown in FIG. 13, the shelter frame 21J further comprises a bridge clip 212J extended between the two auxiliary lenses 221J, 222J for detachably riding on the primary bridge 111J so as to securely mount the detachable shelter frame 20J in front of the primary spectacle frame 10J.

Figure 14:
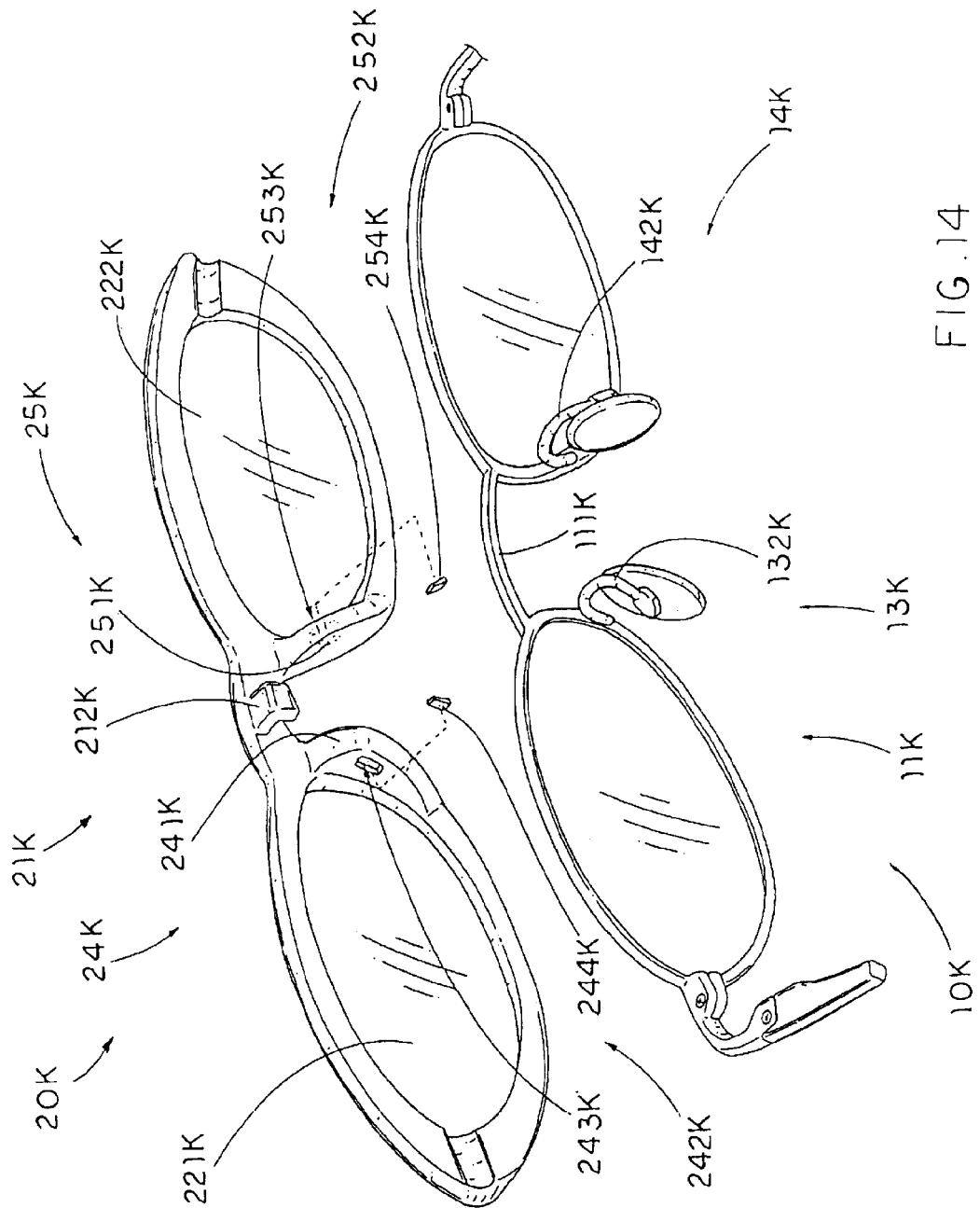
FIGS. 14, 14A, and 14B illustrate a second alternative mode of the spectacles set according to the above third preferred embodiment of the present invention.

FIG. 14 illustrates a second alternative mode of the spectacles set, wherein the shelter frame 21K of the detachable shelter frame 20K is made of plastic instead of conventional metal frame body. The two supporting arms 241K, 251K are integrally extended from two inner sides of the auxiliary lenses 221K, 222K towards the nose supports 13K, 14K.

Figure 14A:
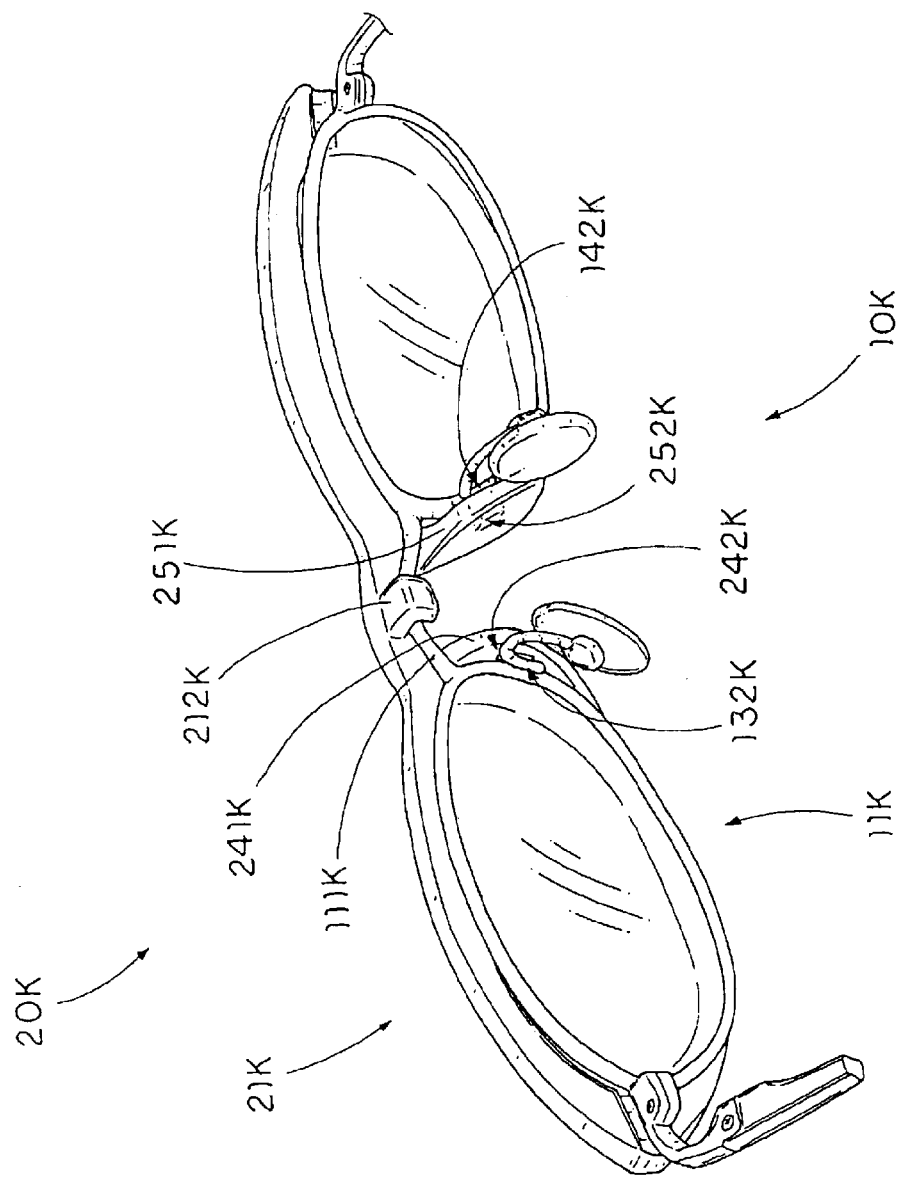
Figure 14B:
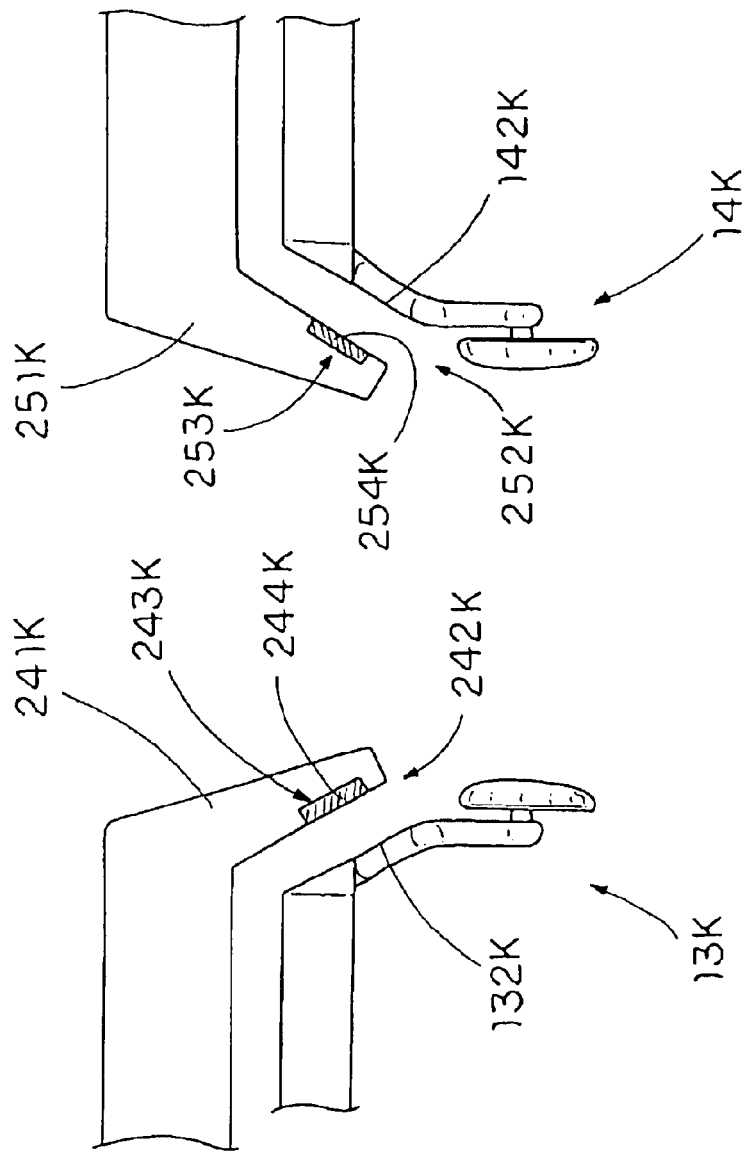

Each of the magnetic seats 242K, 252K comprises a magnetic housing 243K, 253K provided at an outer side of the respective supporting arm 241K, 251K wherein each magnetic seat 242K, 252K and a magnet 244K, 254K mounted in the magnetic housing 243K, 253K, which is arranged to face toward and align with the respective nose support 13K, 14K of the frame body 11K when the detachable shelter frame 20K is mounted in front of the primary spectacle frame 10K, as shown in FIG. 14B.

As shown in FIGS. 14 and 14A, the magnetic seats 242K, 252K are arranged to magnetically attach at the root end portions of the extension arms 132K, 142K respectively when the detachable shelter frame 20K is mounted in front of the primary spectacle frame 10K. It is worth to mention that the root end portion of each of the extension arms 132K, 142K is preferably bent to form a loop shape to enlarge its contacting surface to enhance the magnetic connection between the magnetic seat 242K, 252K and the extension arm 132K, 142K.

In addition, the shelter frame 21K further comprises a bridge clip 212K extended between the two auxiliary lenses 221K, 222K for detachably riding on the primary bridge 111K so as to securely mount the detachable shelter frame 20K in front of the primary spectacle frame 10K.

Figure 15:
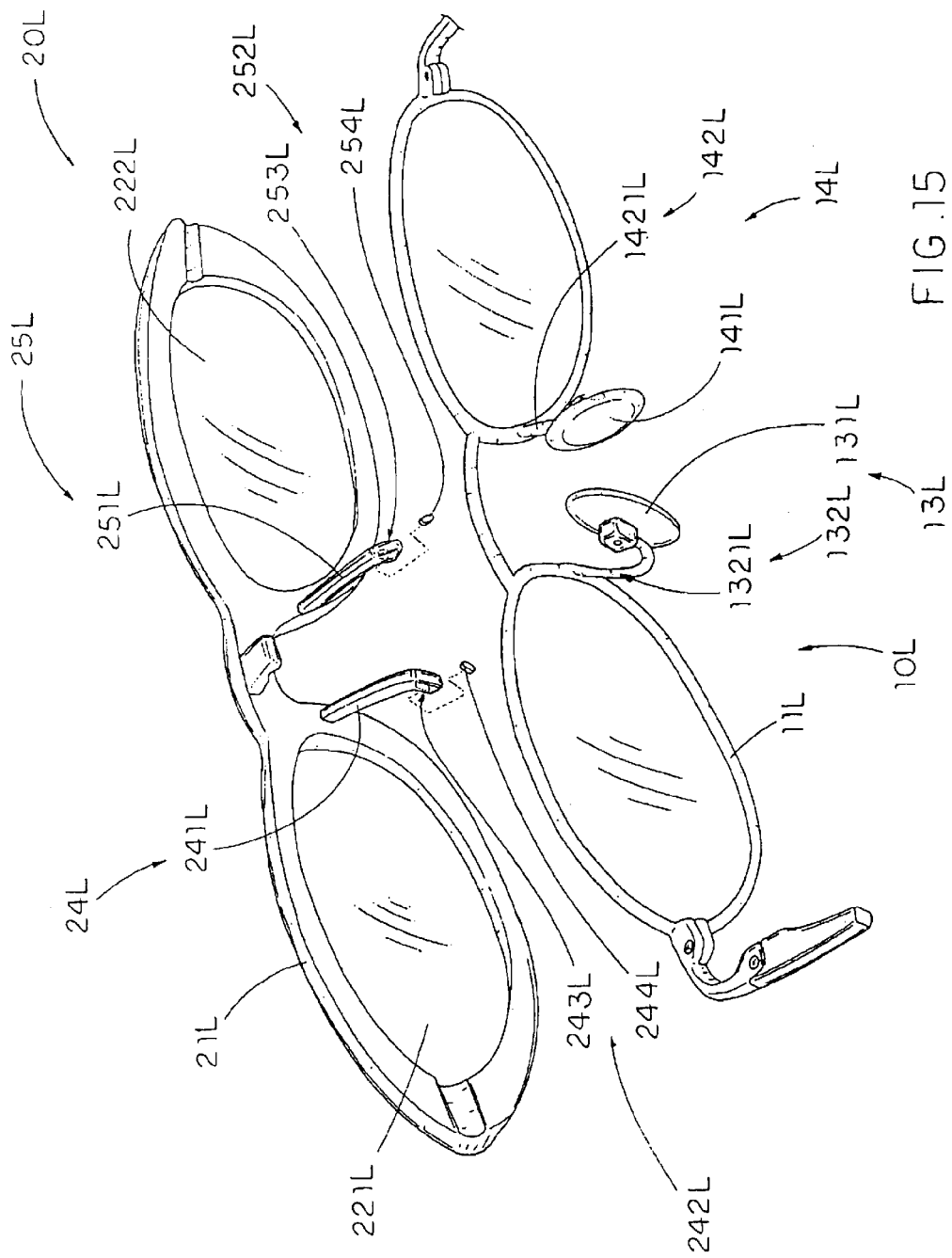
FIG. 15 is a perspective view of a spectacles set according to a fourth preferred embodiment of the present invention.

As shown in FIG. 15, a spectacles set according to a fourth embodiment illustrates another alternative mode of the third embodiment of the present invention, wherein the shelter frame 21L of the detachable shelter frame 20L is made of plastic and the two supporting arms 241L, 251L are rearwardly extended from two inner sides of the auxiliary lenses 221L, 222L towards the nose supports 13L, 14L.

Each of the nose supports 13L, 14L comprises a supporting member 131L, 141L and an extension arm 132L, 142L which has a distal end portion extended from the supporting member 131L, 141L and a root end portion extended from the inner side of the respective lens 121L, 122L, wherein each of the extension arm 132L, 142L is made of a kind of metal having magnetic attraction ability, such as mild steel, low carbon steel and high grade steel, which is attractive to magnetic material such as permanent magnet.

Each of the magnetic attachment arrangements 24L, 25L comprises a supporting arm 241L, 25 IL extending rearwardly from an inner side of the shelter frame 21L towards the respective nose support 13L, 14L for riding on the primary bridge 111L of the frame body 11L and a magnetic seat 242L, 252L which is connected to the supporting arm 241L, 251L and extended to magnetically attach the respective nose support 13L, 14L of the primary spectacle frame 10L so as to securely hold the shelter frame 21L of the detachable shelter frame 20L in front of the frame body 11L of the primary spectacle frame 10L.

Each of the magnetic seats 242L, 252L comprises a magnetic housing 243L, 253L downwardly extended from the respective supporting arm 241L, 251L and a magnet 244L, 254L mounted in the magnetic housing 243L, 253L, which is arranged to frontwardly face toward and align with the distal end of the respective nose support 13L, 14L of the frame body 11L when the detachable shelter frame 20L is mounted in front of the primary spectacle frame 10L.

Accordingly, each magnetic housing 243L, 253L is made of non-magnetic material or soft-magnetic metal having magnetic attraction ability such as mild steel, low carbon steel and high grade steel, wherein each of the magnetic housing 243L, 253L has an opening facing frontwardly in such a manner that when the magnets 244L, 254L are respectively mounted in the magnetic housings 243L, 253L, the magnets 244L, 254L are facing frontwardly to respectively align with the nose supports 13L, 14L of the frame body 11L.

Each magnet 244L, 254L has a thickness smaller than a depth of the respective magnetic housing 243L, 253L so as to define an engaging groove 245L, 255L, when the magnet 244L, 254L is embedded in the magnetic housing 243L, 253L for fittedly engaging with the respective distal end portion of the respective nose support 13L, 14L.

It is worth to mention that the distal end portion of each of the extension arms 132L, 142L forms as an engaging member 1321L, 1421L extended rearwardly, wherein each of the engaging members 1321L, 1421L is fittedly received in the engaging groove 245L, 255L of the respective magnetic seat 242L, 252L so as to alignedly guide the magnetic seats 242L, 252L to magnetically engage with the extension arms 132L, 142L respectively.

Figure 16:
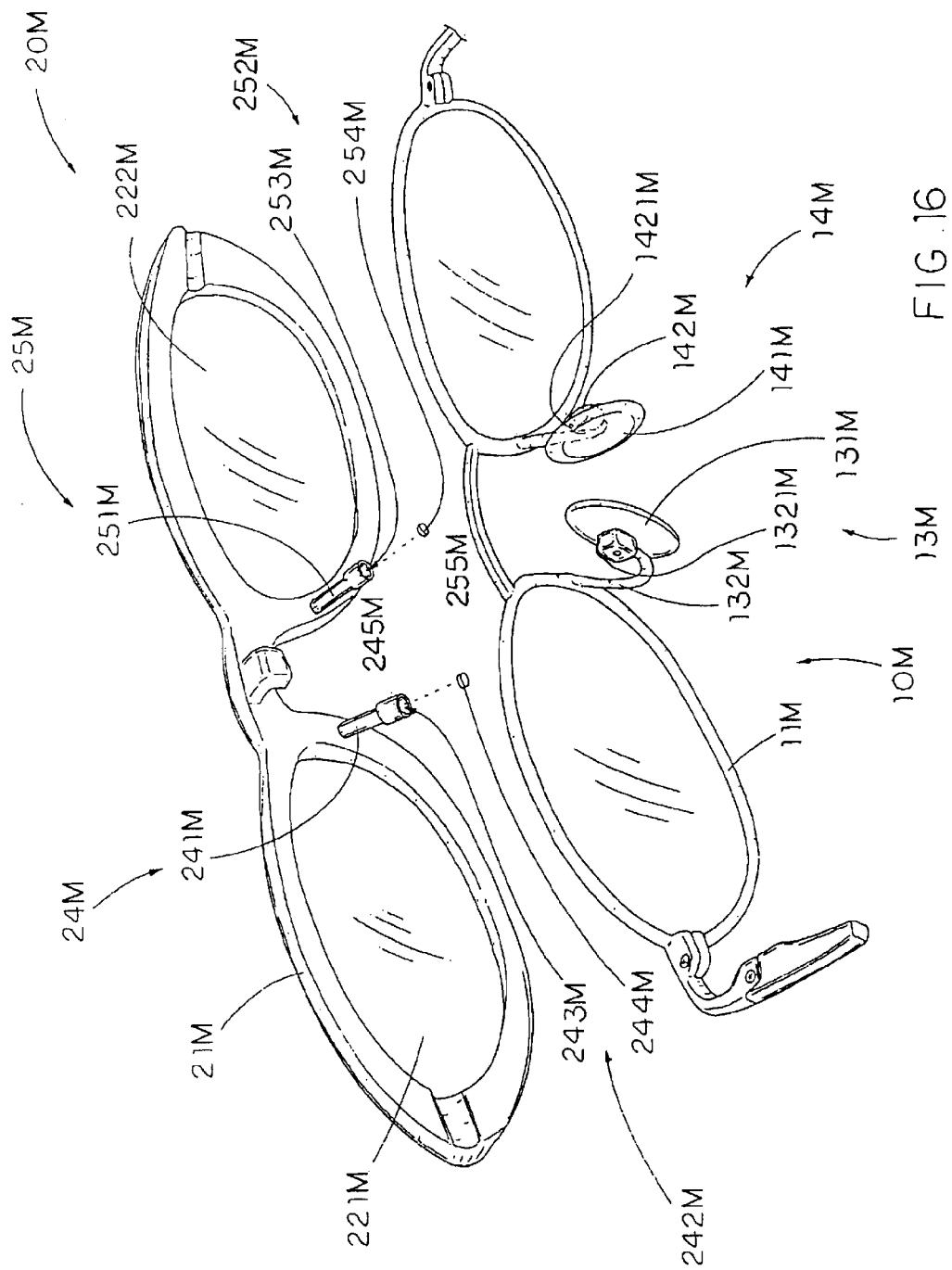
FIG. 16 is a perspective view of a spectacles set according to a fifth preferred embodiment of the present invention.

As shown FIG. 16, a spectacles set of a fifth embodiment illustrates an alternative mode of the third and fourth embodiments of the present invention, wherein the structure of the spectacles set is the same of the above fourth embodiment, except the engagement position between the magnetic housing 243M, 253M and the nose support 13M, 14M.

Each of the nose supports 13M, 14M comprises a supporting member 131M, 141M and an extension arm 132M, 142M which has a distal end portion extended from the supporting member 131M, 141M and a root end portion extended from the inner side of the respective lens 121M, 122M, wherein each of the extension arm 132M, 142M is made of a kind of metal having magnetic attraction ability, such as mild steel, low carbon steel and high grade steel, which is attractive to magnetic material such as permanent magnet.

Each of the magnetic attachment arrangements 24M, 25M comprises a supporting arm 241M, 251M extending rearwardly from an inner side of the shelter frame 21M towards the respective nose support 13M, 14M for riding on the primary bridge 111M of the frame body 11M and a magnetic seat 242M, 252M which is connected to the supporting arm 241M, 251M and extended to magnetically attach the respective nose support 13M, 14M of the primary spectacle frame 10M so as to securely hold the shelter frame 21M of the detachable shelter frame 20M in front of the frame body 11M of the primary spectacle frame 10M.

Each of the magnetic seats 242M, 252M comprises a magnetic housing 243M, 253M rearwardly extended from the respective supporting arm 241M, 251M and a magnet 244M, 254M mounted in the magnetic housing 243M, 253M, which is arranged to rearwardly face toward and align with the respective nose support 13M, 14ML of the frame body 11M when the detachable shelter frame 20M is mounted in front of the primary spectacle frame 10M.

Accordingly, each magnetic housing 243M, 253M is made of non-magnetic material or soft-magnetic metal having magnetic attraction ability such as mild steel, low carbon steel and high grade steel, wherein each of the magnetic housing 243M, 253M has an opening facing rearwardly in such a manner that when the magnets 244M, 254M are respectively mounted in the magnetic housings 243M, 253L, the magnets 244M, 254M are facing rearwardly to respectively align with the nose supports 13M, 14M of the frame body 11M.

Each magnet 244M, 254L has a thickness smaller than a depth of the respective magnetic housing 243M, 253M so as to define an engaging groove 245M, 255M, when the magnet 244M, 254M is embedded in the magnetic housing 243M, 253M for fittedly engaging with the respective distal end portion of the respective nose support 13M, 14M.

It is worth to mention that the distal end portion of each of the extension arms 132M, 142M forms as an engaging member 1321M, 1421M extended frontwardly, wherein each of the engaging members 1321M, 1421M is fittedly received in the engaging groove 245M, 255M of the respective magnetic seat 242M, 252M so as to alignedly guide the magnetic seats 242M, 252M to magnetically engage with the extension arms 132M, 142M respectively.

Figure 17A:
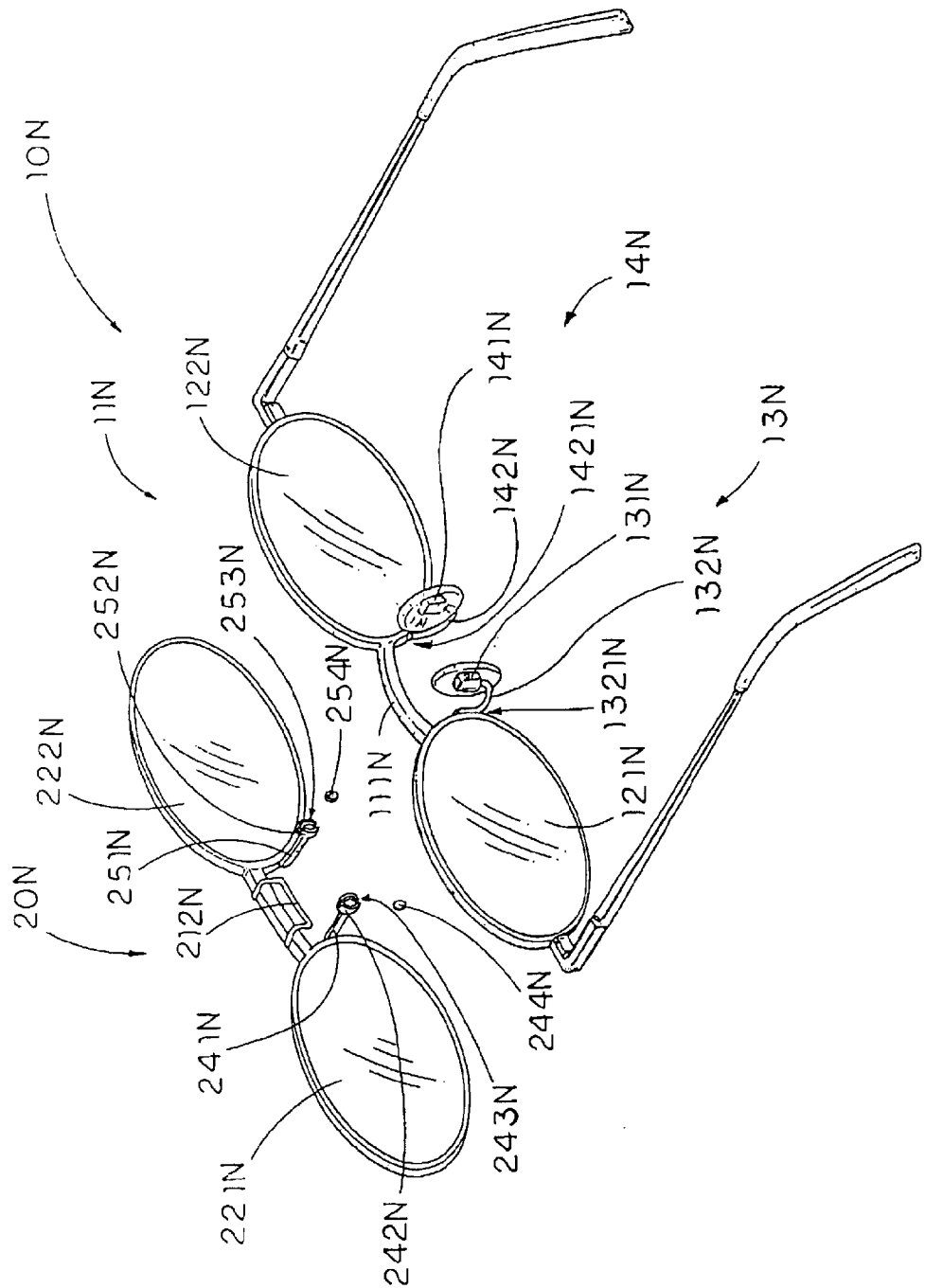
FIGS. 17A and 17B illustrate an alternative mode of the spectacles set according to the above fifth preferred embodiment of the present invention.
Figure 17B:
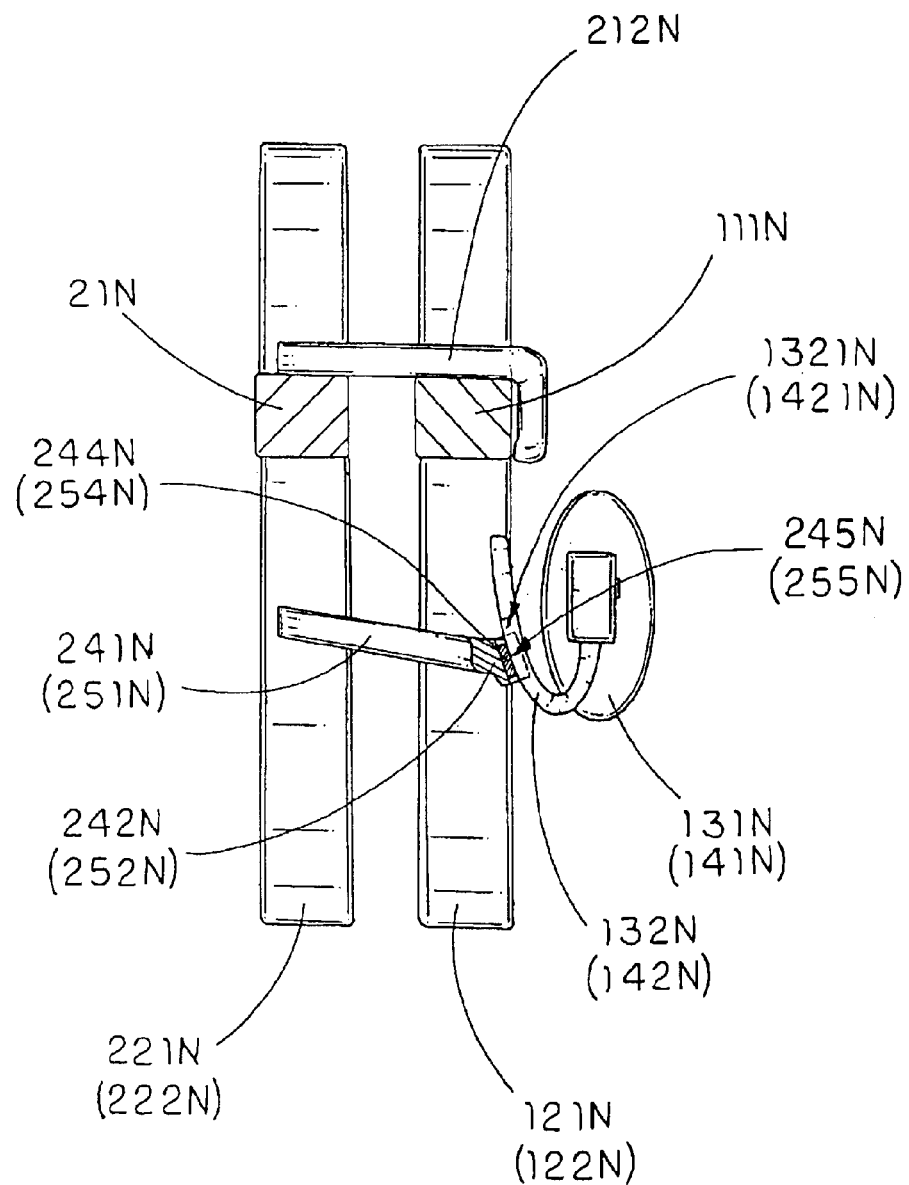

FIGS. 17A and 17B illustrate an alternative mode of the fifth embodiment of the present invention, which is a further modification of the third embodiment. Accordingly, the two supporting arms 241N, 251N are rearwardly and inclinedly extended from two lower portions of two inner sides of the shelter frame 21N respectively towards the extension arms 132N, 142N of the nose supports 13N, 14N so as to alignedly guide the magnetic seats 242N, 252N to magnetically engage with the shoulder portions 1321N, 1421N of the nose supports 13N, 14N respectively.

Each of the magnetic housings 243N, 253N, having a U-shaped cross section, is rearwardly and suspendedly affixed to the rear end of the respective supporting arm 241N, 251J to fittedly engage with the shoulder portion 1321N, 1421N of the respective extension arm 132N, 142N at a position between a distal end portion and a root end portion, as shown in FIG. 17B. Accordingly, the shoulder portion 1321N, 1421N is formed at a front side of the extension arm 132N, 142N between the distal end portion and a root end portion, wherein the shoulder portions 1321N, 1421N of the nose supports 13N, 14N are facing frontwardly to magnetically engage with the magnetic seats 242N, 252N respectively.

Each magnet 244N, 254N has a thickness smaller than a depth of the respective magnetic housing 243N, 253N so as to define an engaging groove 245N, 255N between two sidewalls of the magnetic housing 243N, 253N, when the magnet 244N, 254N is embedded in the magnetic housing 243N, 253N for fittedly engaging with the respective shoulder portion 1321N, 1421N of the respective nose support 13N, 14N.

As shown in FIGS. 17A and 17B, the shelter frame 21N further comprises a bridge clip 212N extended between the two auxiliary lenses 221N, 222N for detachably riding on the primary bridge 111N so as to securely mount the detachable shelter frame 20N in front of the primary spectacle frame 10N.

As shown in FIG. 18, a spectacles set of a sixth embodiment illustrates another alternative mode of the first embodiment of the present invention. According to the sixth embodiment, each of the nose supports 13P, 14P comprises a supporting member 131P, 141P and an extension arm 132P, 142P which has a distal end portion extended from the supporting member 131P, 141P and a root end portion extended from the inner side of the respective lens 121P, 122P, wherein each of the extension arms 132P, 142P is made of a kind of metal having magnetic attraction ability, such as mild steel, low carbon steel and high grade steel, which is attractive to magnetic material such as permanent magnet.

The two extension arms 132P, 142P of the nose supports 13P, 14P are rearwardly extended from the frame body 11P wherein each of the extension arms 132, 142 is bent to form a shoulder portion 1321P, 1421P between the distal end portion and the root end portion. As shown in FIG. 18, each of the extension arms 132P, 142P is made in U-shape wherein the shoulder portion 1321P, 1421P is formed at a front side of the respective extension arm 132P, 142P between the distal end portion and the root end portion, wherein the shoulder portions 1321P, 1421P of the nose supports 13P, 14P are facing rearwardly to magnetically attract with the magnetic seats 242P, 252P of the detachable shelter frame 20P respectively.

Each of the magnetic attachment arrangements 24P, 25P comprises a supporting arm 241P, 251P extending rearwardly from an inner side of the shelter frame 21P towards the respective nose support 13P, 14P and a magnetic seat 242P, 252P which is connected to the supporting arm 241P, 251P and extended to magnetically attach the respective nose support 13P, 14P of the primary spectacle frame 10P so as to securely hold the shelter frame 21P of the detachable shelter frame 20P in front of the frame body 11P of the primary spectacle frame 10P.

Each of the magnetic seats 242P, 252P comprises a magnetic housing 243P, 253P rearwardly extended from the respective supporting arm 241P, 251P wherein each magnetic seat 242P, 252P is made of non-magnetic material or soft-magnetic metal having magnetic attraction ability such as mild steel, low carbon steel and high grade steel and a magnet 244P, 254P mounted in the magnetic housing 243P, 253P, which is arranged to face toward and align with the respective nose support 13P, 14P of the frame body 11P when the detachable shelter frame 20P is mounted in front of the primary spectacle frame 10P.

According to the sixth embodiment, the two supporting arms 241P, 251P are in L-shaped and extended from two end portions of the shelter bridge 211P, wherein each of the supporting arms 241P, 251P comprises a riding portion 2411P, 2511P rearwardly extended from the shelter bridge 211P to ride on the primary bridge 111P and a mounting portion 2412P, 2512P downwardly and integrally extended from a rear end of the respective riding body 2411P, so that the riding portions of the supporting arms 241P, 251P are capable of substantially riding on the primary bridge 111P when the detachable shelter frame 20P is mounted in front of the primary spectacle frame 10P so as to support the detachable shelter frame 20P and further prevent any downward and sideward movement of the detachable shelter frame 20P with respect to the primary spectacle frame 10P.

Figure 19:
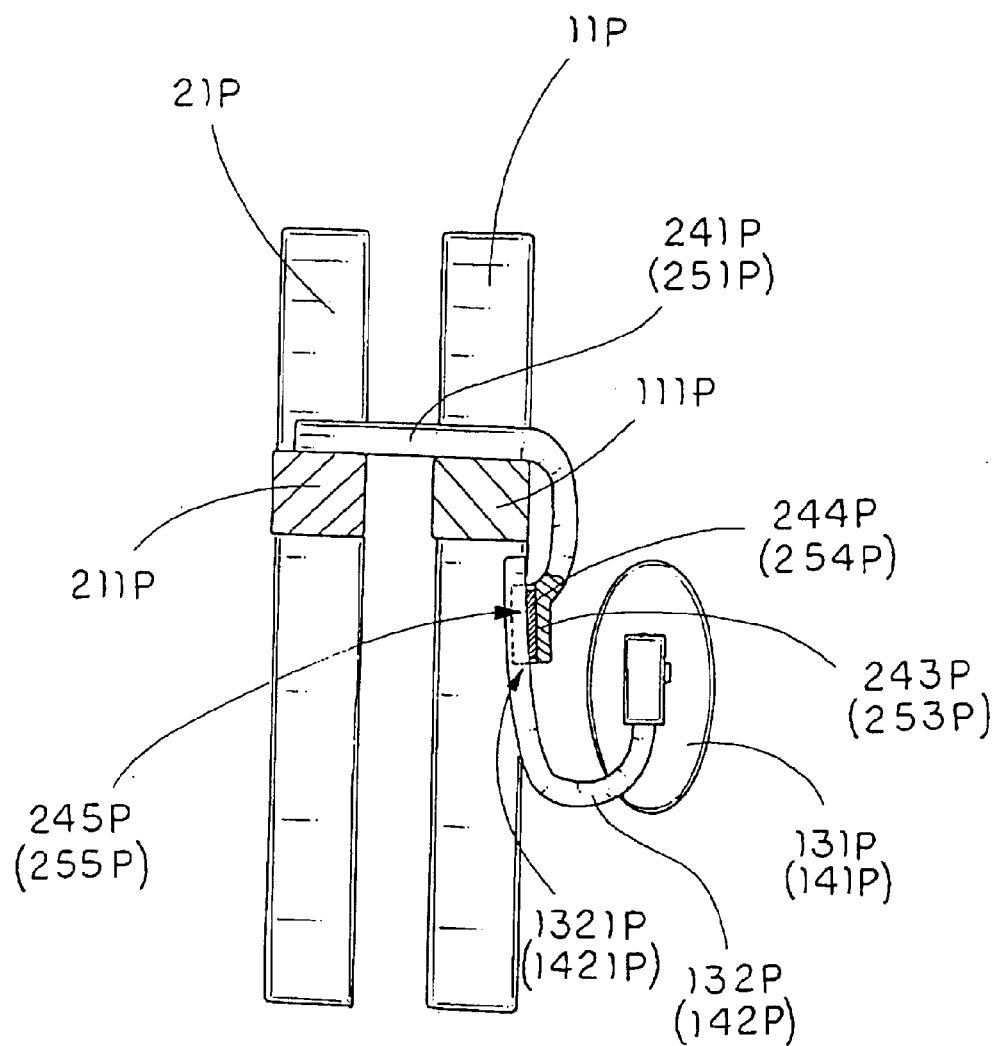
FIG. 19 is a sectional view of the spectacles set according to the above sixth preferred embodiment of the present invention.

As shown in FIGS. 18 and 19, the magnetic seats 242P, 252P are connected to rear ends of the mounting portions 2412P, 2512P of the supporting arms 241P, 251P respectively to magnetically attach to the shoulder portions 1321P, 1421P of the extension arms 132P, 142P of the nose supports 13P, 14P respectively. Each of magnetic housings 243P, 253P, having a reverse U-shaped cross section, is downwardly and suspendedly affixed to the rear end of the mounting portion 2412P, 2512P of the respective supporting arm 241P, 251P.

Each of the magnetic housing 243P, 253P has an opening facing frontwardly in such a manner that when the magnets 244P, 254P are respectively mounted in the magnetic housings 243P, 253P, the magnets 244P, 254P are facing frontwardly to respectively align with the nose supports 13P, 14P of the frame body 11P.

Figure 20:
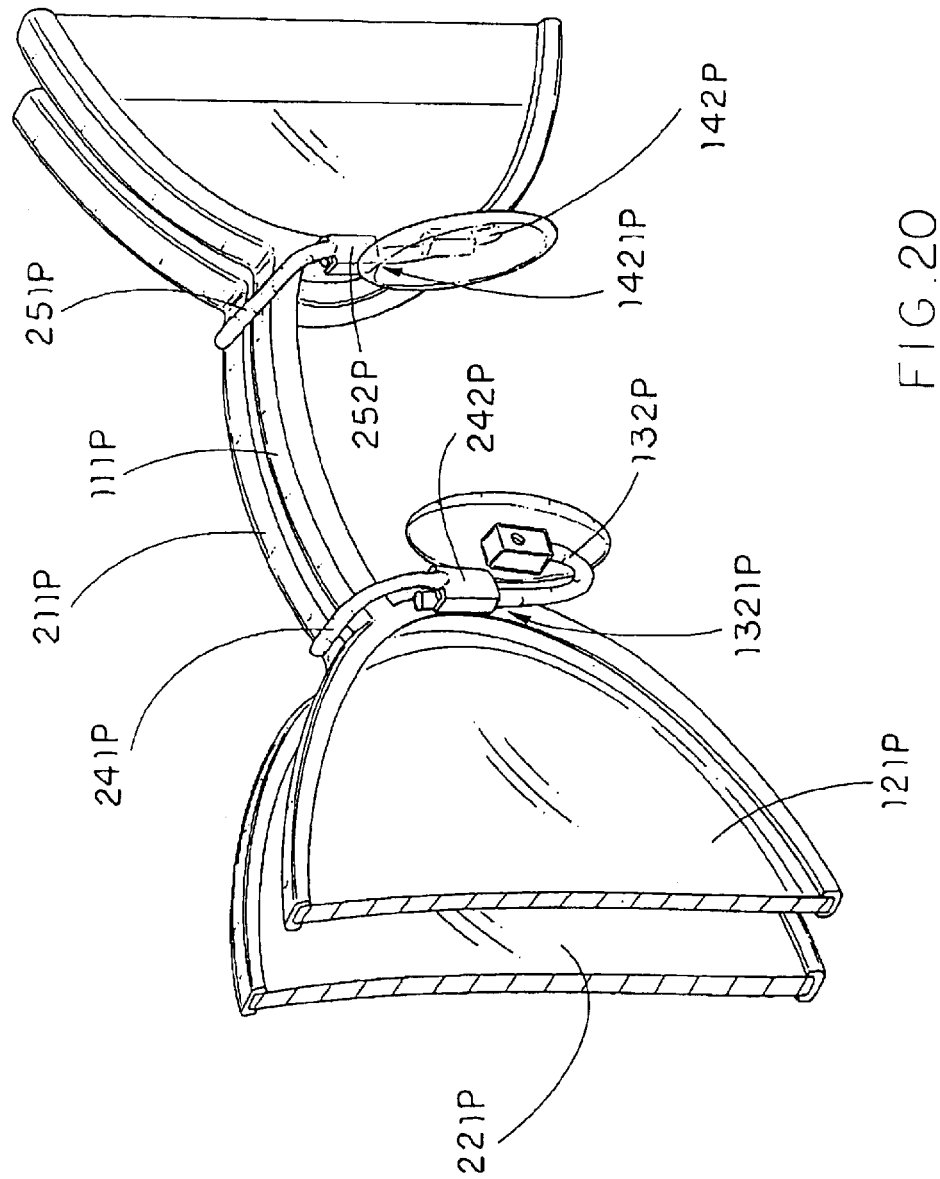
FIG. 20 is a perspective view of the spectacles set according to the above sixth preferred embodiment of the present invention, illustrating the detachable shelter frame being mounted in front of the primary spectacle frame.

Each magnet 244P, 254P has a thickness smaller than a depth of the respective magnetic housing 243P, 253P so as to define an engaging groove 245P, 255P between two sidewalls of the magnetic housing 243P, 253P when the magnet 244P, 254P is embedded in the magnetic housing 243P, 253P for fittedly engaging with the respective shoulder portion 1321P, 1421P of the respective nose support 13P, 14P, as shown in FIG. 20. In other words, the engaging groove 245P, 255P is defined between two sidewalls of the respective magnetic housing 243P, 253P.

Figure 21:
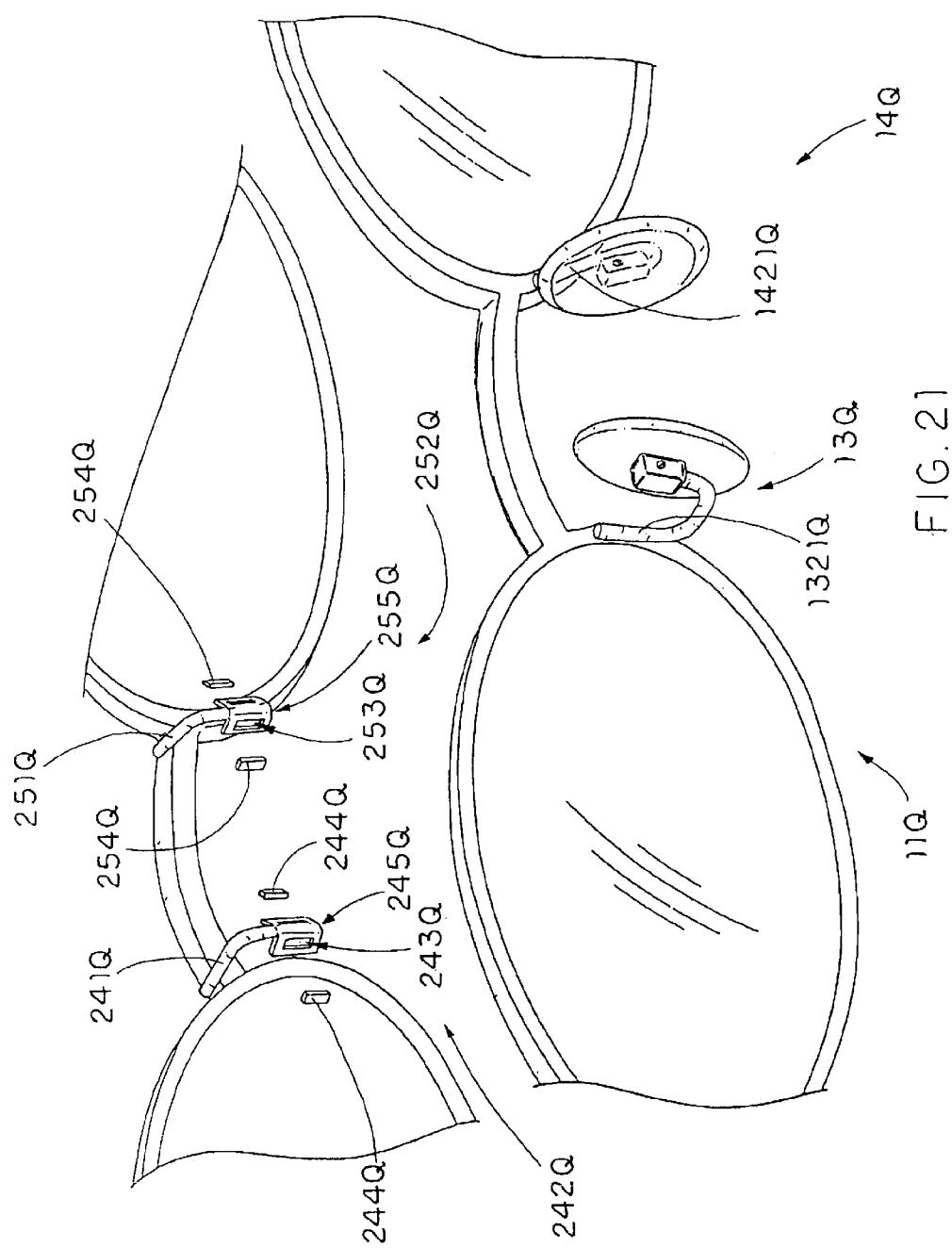
FIG. 21 illustrates a first alternative mode of the spectacles set according to the above sixth preferred embodiment of the present invention.

FIG. 21 illustrates a first alternative mode of the sixth embodiment, wherein each of the magnetic seats 242Q, 252Q comprises a magnetic housing 243Q, 253Q extended from the rear end of the respective supporting arm 241Q, 251Q and two magnets 244Q, 254Q mounted in the magnetic housing 243Q, 253Q, which is arranged to face toward and align with the shoulder portion 1321Q, 1421Q of the respective nose support 13Q, 14Q of the frame body 11Q.

As shown in FIG. 21, each of the magnetic housing 243Q, 253Q, having a reverse U-shaped cross section, is downwardly and suspendedly affixed to the bottom end of the respective supporting arm 241Q, 251Q to define an engaging groove 245Q, 255Q between the two sidewalls thereof, wherein the two magnets 244Q, 254Q are received at two sidewalls of the respective magnetic housing 243Q, 253Q. Accordingly, the two magnets 244Q, 254Q are embedded at two sidewalls of the respective magnetic housing 243Q, 253Q wherein the magnetic seats 242Q, 252Q are respectively attached to the two nose supports 13Q, 14Q by magnetically engaging the two shoulder portions 1321Q, 1421Q of the extension arms 13Q, 14Q in the two engaging grooves 245Q, 255Q respectively.

Figure 22A:
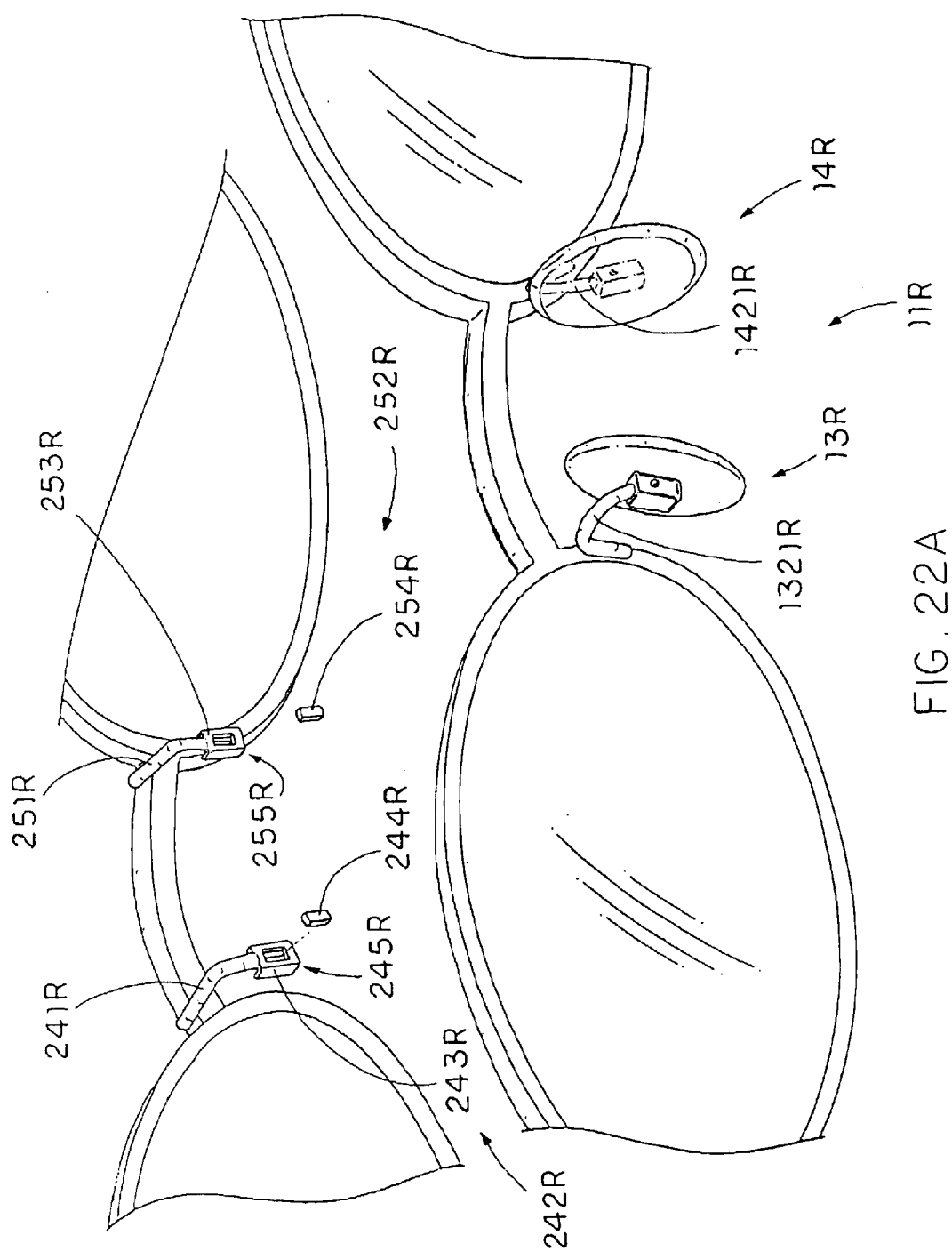
FIGS. 22A and 22B illustrate a second alternative mode of the spectacles set according to the above sixth preferred embodiment of the present invention.
Figure 22B:
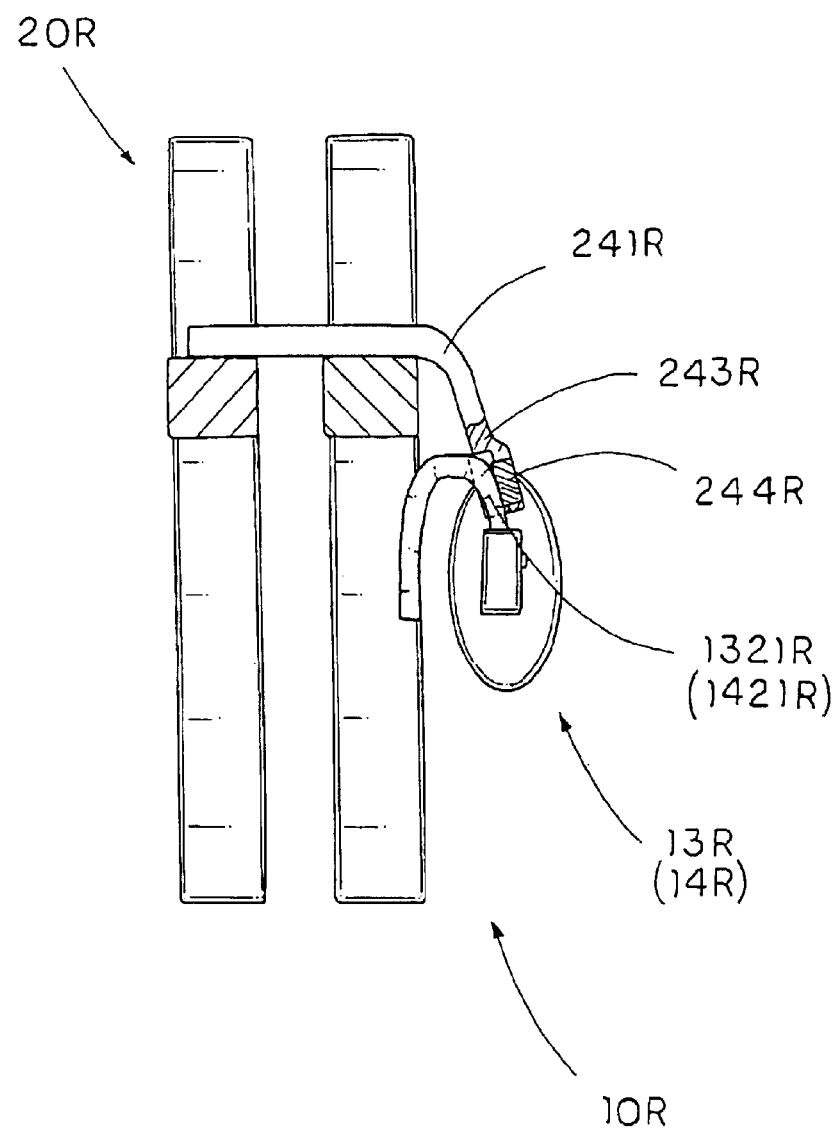

FIGS. 22A and 22B illustrate a second alternative mode of the sixth embodiment, wherein each of the magnetic seats 242R, 252R comprises a magnetic housing 243R, 253R extended from the rear end of the respective supporting arm 241R, 251R and a magnet 244R, 254R mounted in the magnetic housing 243R, 253R, which is arranged to face toward and align with the shoulder portion 1321R, 1421R of the respective nose support 13R, 14R of the frame body 11R.

As shown in FIG. 22A, each of the magnetic housing 243R, 253R, having a reverse U-shaped cross section, is downwardly and suspendedly affixed to the bottom end of the respective supporting arm 241R, 251R to define an engaging groove 245R, 255R between the two sidewalls thereof, wherein the magnet 244R, 254R is received at a rear wall of the respective magnetic housing 243R, 253R. Accordingly, the magnet 244R, 254R is embedded at the rear wall of the respective magnetic housing 243R, 253R wherein the magnetic seats 242R, 252R are respectively attached to the two nose supports 13R, 14R by magnetically engaging the two shoulder portions 1321R, 1421R of the extension arms 13R, 14R in the two engaging grooves 245R, 255R respectively, as shown in FIG. 22B.

Figure 23:
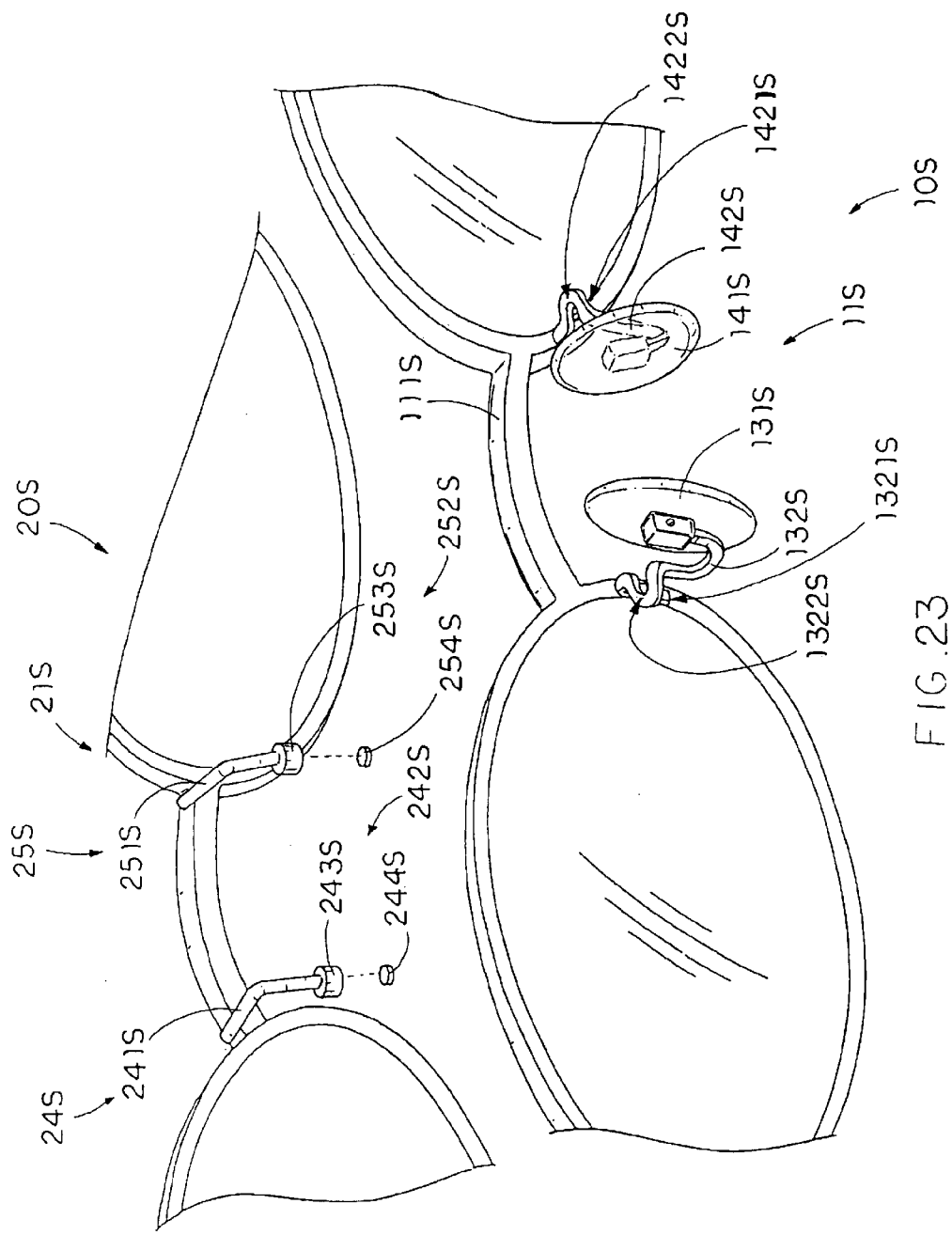
FIG. 23 is a perspective view of a spectacles set according to a seventh preferred embodiment of the present invention.

As shown in FIG. 23, a spectacles set of a seventh embodiment illustrates another alternative mode of the second embodiment of the present invention, wherein the primary spectacle frame 10S and the detachable shelter frame 20S have the similar structural components as shown in the second embodiment, expect the nose supports 13S, 14S and the magnetic seats 242S, 252S.

As shown in FIG. 23, each of the nose supports 13S, 14S comprises a supporting member 131S, 141S and an extension arm 132S, 142S which has a distal end portion extended from the supporting member 131S, 141S and a root end portion extended from the inner side of the respective lens 121S, 122S, wherein each of the extension arm 132S, 142S is made of a kind of metal having magnetic attraction ability, such as mild steel, low carbon steel and high grade steel, which is attractive to magnetic material such as permanent magnet. Each of the extension arms 132S, 142S is bent to form an angled shoulder portion 1321S, 1421S between the distal end portion and the root end portion, wherein each of the shoulder portion 1321S, 1421S forms a top engaging platform 1322S, 1422S to magnetically engage with the respective magnetic seat 242S, 252S.

Each of the magnetic attachment arrangements 24S, 25S comprises a supporting arm 241S, 251S extending rearwardly from an inner side of the shelter frame 21S towards the respective nose support 13S, 14S for riding on the primary bridge 111S of the frame body 11S and a magnetic seat 242S, 252S which is connected to the supporting arm 241S, 251S and extended to magnetically attach the respective nose support 13S, 14S of the primary spectacle frame 10S so as to securely hold the shelter frame 21S of the detachable shelter frame 20S in front of the frame body 11S of the primary spectacle frame 10S.

Each of the magnetic seats 242S, 252S comprises a magnetic housing 243S, 253S rearwardly extended from the respective supporting arm 241S, 251S wherein each magnetic seat 242S, 252S is made of non-magnetic material or soft-magnetic metal having magnetic attraction ability such as mild steel, low carbon steel and high grade steel and a magnet 244S, 254S mounted in the magnetic housing 243S, 253S, which is arranged to face toward and align with the respective nose support 13S, 14S of the frame body 11S when the detachable shelter frame 20S is mounted in front of the primary spectacle frame 10S.

Accordingly, since the extension arms 132S, 142S are outwardly bent to form the angled shoulder portion 1321S, 1421S to form the top engaging platforms 1322S, 1422S respectively, a contacting area between the magnetic seat 242S, 252S and the extension arm 132S, 142S is substantially enlarged such that the magnetic seats 242S, 252S are easily engaged with the top engaging platform 1322S, 1422S of the nose supports 13S, 14S.

FIG. 24 illustrates an alternative mode of the seventh embodiment, wherein the supporting arm 241T, 251T extending rearwardly from an inner side of the shelter frame 21S towards the respective nose support 13T, 14T to form a shelter bridge 211T for riding on the primary bridge 111T of the frame body 11T and a magnetic seat 242T, 252T which is rearwardly extended from the shelter bridge 211T and extended to magnetically attach on the top engaging platform 1322T, 1422T of the shoulder portion 1321T, 1421T of the respective nose support 13T, 14T of the primary spectacle frame 10T so as to securely hold the shelter frame 21T of the detachable shelter frame 20T in front of the frame body 11T of the primary spectacle frame 10T.

In addition, the extension arms 132T, 142T are inwardly bent to form the angled shoulder portion 1321T, 1421T to form the top engaging platforms 1322T, 1422T respectively to magnetically engage with the magnetic seat 252T, 252T.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A spectacles set comprising a primary spectacle frame and a detachable shelter frame adapted for detachably mounting in front of said primary spectacle frame, wherein:

said primary spectacle frame comprising a frame body for mounting a pair of lenses in position, wherein said frame body comprises a primary bridge connected between said two lenses, two nose supports extended from two inner sides of said lenses respectively, and two side extensions provided at two outer sides of said lenses for coupling a pair of temples respectively;

each of said nose supports comprising a supporting member and an extension arm, having magnetic attraction ability, which has a distal end portion extended from said supporting member and a root end portion extended from said inner side of said respective lens; and said detachable shelter frame comprising a shelter frame for supporting two auxiliary lenses and a pair of magnetic attachment arrangements connected to said shelter frame, wherein each of said magnetic attachment arrangements comprises a supporting arm extending rearwardly from an inner side of said shelter frame towards said respective extension arm and a magnetic seat which is connected to said supporting arm and extended to magnetically attach said respective extension arm of said primary spectacle frame so as to securely hold said shelter frame in front of said primary spectacle frame.

2. The spectacles set, as recited in claim 1, wherein each of said extension arms is bent to form an angled shoulder portion between said distal end portion and said root end portion, wherein each of said shoulder portions forms a top engaging platform such that said magnetic seats are magnetically engaged on said top engaging platforms respectively.

3. The spectacles set, as recited in claim 2, wherein said two supporting arms, each having a L-shaped, are rearwardly extended from said shelter frame to ride on said primary bridge, wherein said two magnetic seats comprises a magnetic housing extended from a rear end of said respective supporting arm towards said respective extension arm and a magnet mounted in said magnetic housing which is arranged to face toward and align with said top engaging platform of said respective extension arm of said nose support when said detachable shelter frame is mounted in front of said primary spectacle frame.

4. The spectacles set, as recited in claim 2, wherein said two supporting arms are integrally extended from said shelter frame to form a shelter bridge to ride on said primary bridge, wherein said two magnetic seats comprises a magnetic housing rearwardly extended from said shelter bridge towards said respective extension arm and a magnet mounted in said magnetic housing which is arranged to face toward and align with said top engaging platform of said respective extension arm of said nose support when said detachable shelter frame is mounted in front of said primary spectacle frame.

5. The spectacles set, as recited in claim 1, wherein each of said magnetic seats comprises a magnetic housing downwardly extended from said respective supporting arm and a magnet mounted in said magnetic housing, which is arranged to frontwardly face towards and align with said distal end portion of said respective nose support when said detachable shelter frame is mounted in front of said primary spectacle frame.

6. The spectacles set, as recited in claim 5, wherein each said magnet has a thickness smaller than a depth of said respective magnetic housing so as to define an engaging groove when said magnet is embedded in said magnetic housing for fittedly engaging with said distal end portion of said respective nose support.

7. The spectacles set, as recited in claim 6, wherein said distal end portion of each of said extension arms forms as an engaging member extended rearwardly, wherein each of said engaging members is fittedly received in said engaging groove of said respective magnetic seat so as to alignedly guide said magnetic seats to magnetically engage with said extension arms respectively.

8. The spectacles set, as recited in claim 1, wherein each of said magnetic seats comprises a magnetic housing rearwardly extended from said respective supporting arm and a magnet mounted in said magnetic housing, which is arranged to rearwardly face towards and align with said distal end portion of said respective nose support when said detachable shelter frame is mounted in front of said primary spectacle frame.

9. The spectacles set, as recited in claim 8, wherein each said magnet has a thickness smaller than a depth of said respective magnetic housing so as to define an engaging groove when said magnet is embedded in said magnetic housing for fittedly engaging with said distal end portion of said respective nose support.

10. The spectacles set, as recited in claim 9, wherein said distal end portion of each of said extension arms forms as an engaging member extended frontwardly, wherein each of said engaging members is fittedly received in said engaging groove of said respective magnetic seat so as to alignedly guide said magnetic seats to magnetically engage with said extension arms respectively.

11. The spectacles set, as recited in claim 1, wherein each of said nose supports has a shoulder portion formed at a front side of said respective extension arm between said distal end portion and said root portion, wherein said shoulder portions of said nose supports are facing frontwardly to magnetically engage with said magnetic seats respectively.

12. The spectacles set, as recited in claim 11, wherein each of said magnetic seats comprises a magnetic housing, having a U-shaped cross section, rearwardly and suspendedly extended from said respective supporting arm and a magnet mounted in said magnetic housing, which is arranged to face towards and align with said shoulder portion of said respective nose support when said detachable shelter frame is mounted in front of said primary spectacle frame.

13. The spectacles set, as recited in claim 12, wherein each said magnet has a thickness smaller than a depth of said respective magnetic housing so as to define an engaging groove between two sidewalls of said magnetic housing when said magnet is embedded in said magnetic housing for fittedly engaging with said shoulder portion of said respective nose support.

14. The spectacles set, as recited in claim 13, wherein said two supporting arms are rearwardly and inclinedly extended from two lower portions of two inner sides of said shelter frame respectively towards said shoulder portions of said extension arms of said nose supports so as to alignedly guide said magnetic seats to magnetically engage with said shoulder portions of said nose supports respectively.

15. The spectacles set, as recited in claim 11, wherein said two supporting arms are rearwardly and inclinedly extended from two lower portions of two inner sides of said shelter frame respectively towards said shoulder portions of said extension arms of said nose supports so as to alignedly guide said magnetic seats to magnetically engage with said shoulder portions of said nose supports respectively.

16. The spectacles set, as recited in claim 1, wherein each of said nose supports has a shoulder portion formed at a front side of said respective extension arm between said distal end portion and said root end portion, wherein said shoulder portions of said nose supports are facing rearwardly to magnetically engage with said magnetic seats respectively.

17. The spectacles set, as recited in claim 16, wherein each of said magnetic seats comprises a magnetic housing, having a U-shaped cross section, rearwardly and suspendedly extended from said respective supporting arm and a magnet mounted in said magnetic housing, which is arranged to frontwardly face towards and align with said shoulder portion of said respective nose support when said detachable shelter frame is mounted in front of said primary spectacle frame.

18. The spectacles set, as recited in claim 17, wherein said magnet has a thickness smaller than a depth of said respective magnetic housing so as to define an engaging groove between two sidewalls of said magnetic housing when said magnet is embedded in said magnetic housing for fittedly engaging with said shoulder portion of said respective nose support.

19. The spectacles set, as recited in claim 16, wherein each of said magnetic seats comprises a magnetic housing, having a U-shaped cross section, rearwardly and suspendedly extended from said respective supporting arm to define an engaging groove between two sidewalls of said magnetic housing for fittedly engaging with said shoulder portion of said respective nose support, and two magnets respectively mounted at said sidewalls of said respective magnetic housing to magnetically engage said shoulder portion of said respective nose support within said engaging grove when said detachable shelter frame is mounted in front of said primary spectacle frame.

20. The spectacles set, as recited in claim 16, wherein each of said magnetic seats comprises a magnetic housing, having a U-shaped cross section, rearwardly and suspendedly extended from said respective supporting arm to define an engaging groove between two sidewalls of said magnetic housing for fittedly engaging with said shoulder portion of said respective nose support, and a magnet mounted at a rear wall of said respective magnetic housing to magnetically engage said shoulder portion of said respective nose support within said engaging grove when said detachable shelter frame is mounted in front of said primary spectacle frame.

* * * * *